(12) United States Patent
Agrawal

(10) Patent No.: US 7,516,449 B2
(45) Date of Patent: Apr. 7, 2009

(54) RUN-TIME TYPE CONVERSION

(75) Inventor: Sachin O. Agrawal, Jalna (IN)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 11/029,583

(22) Filed: Jan. 4, 2005

(65) Prior Publication Data

US 2006/0150164 A1 Jul. 6, 2006

(51) Int. Cl.
G06F 9/44 (2006.01)

(52) U.S. Cl. .................. 717/165; 707/103 R; 717/136; 717/140

(58) Field of Classification Search ............. 707/103 R, 707/103 Y; 717/100, 104, 108, 106, 162, 717/165, 136, 137, 140, 148
See application file for complete search history.

(56) References Cited

U.S. PATENT DOCUMENTS

| 5,437,025 | A | | 7/1995 | Bale et al. | |
|---|---|---|---|---|---|
| 5,907,707 | A | * | 5/1999 | Ramalingam et al. | 717/104 |
| 6,092,079 | A | * | 7/2000 | Gerard et al. | 707/103 R |
| 6,138,269 | A | * | 10/2000 | Ball et al. | 717/108 |
| 6,401,083 | B1 | | 6/2002 | Agarwal et al. | |
| 6,405,363 | B1 | * | 6/2002 | Carlson et al. | 717/100 |
| 6,510,504 | B2 | | 1/2003 | Satyanarayanan | |
| 6,704,746 | B2 | | 3/2004 | Sokolov et al. | |
| 6,938,140 | B2 | * | 8/2005 | Louie et al. | 711/165 |
| 2003/0131347 | A1 | | 7/2003 | Allison | |
| 2004/0006765 | A1 | | 1/2004 | Goldman | |
| 2004/0025142 | A1 | | 2/2004 | Mandal et al. | |
| 2004/0216132 | A1 | * | 10/2004 | Messec et al. | 719/315 |

OTHER PUBLICATIONS

Samek, "Portable Inheritance and Polymorphism in C", Dec. 1997, Embedded Systems Programming.*
Lippman et al., "C++ Primer, Third Edition", Apr. 1998, Addison Wesley Professional.*

* cited by examiner

Primary Examiner—Lewis A Bullock, Jr.
Assistant Examiner—Jue S Wang
(74) Attorney, Agent, or Firm—Schmeiser, Olsen & Watts; William H. Steinberg

(57) ABSTRACT

A method, system and computer program product for converting, at run-time, a class of an object from a source class to a destination class. A statement in intermediate code indicating the conversion of the object from the source class to destination class is identified. The destination class is determined to be polymorphic to the source class. Memory space required for the destination class is determined to be less than or equal to the memory space required for the source class. A class hierarchy is traversed up and down at compile time to generate conversion code. At runtime and via up and down traversals of the class hierarchy, the pointer to a virtual function table (v-table) of the object is updated from referencing the v-table of the source class to referencing the v-table of the destination class.

4 Claims, 18 Drawing Sheets

| Desired conversion | Intermediate destination classes | Types of intermediate conversions |
| --- | --- | --- |
| Class B to Class D | Class A | Up conversion |
| | Class C | Down conversion |
| | Class D | Down conversion |
| Class B to Class E | Class E | Down conversion with construction of additional sub-objects |
| Class D to Class A | Class C | Up conversion |
| | Class A | Up conversion |
| Class E to Class B | Class B | Up conversion with destruction of remaining sub-objects |
| Class D to Class B | Class C | Up conversion |
| | Class A | Up conversion |
| | Class B | Down conversion |

*FIG. 10*

RUN-TIME TYPE CONVERSION

BACKGROUND OF THE INVENTION

1. Technical Field

This invention relates to a method, system and computer program product for converting a class of an object to another class at run-time in an object-oriented programming environment.

2. Related Art

In object-oriented systems, software objects map to real-world objects. Object-oriented systems development includes the process of identifying, analyzing, refining and implementing these mappings. Real-world object instances evolve and their properties and behavior, and more specifically, their classes change over time. In conventional object-oriented systems, however, software object instances are, in effect, static, and therefore do not map to a real-world object's changing class. With known techniques that address the static nature of software object instances, space requirements and/ or execution costs related to object operations create unattractive burdens. Thus, a need exists in the object-oriented programming arts for an improved technique to dynamically convert a class of an object at run-time.

SUMMARY OF THE INVENTION

In first embodiments, the present invention provides a method for converting, at run-time, a class of an object in an object-oriented programming environment comprising:

providing a plurality of classes including a first class and a second class, the second class being any class of the plurality of classes;

providing a plurality of class layout data structures (class layouts), each class of the plurality of classes being associated with a class layout of the plurality of class layouts;

providing an object initially of the first class;

providing an object layout data structure (object layout), the object being associated with the object layout, and the object layout being associated with an address in a memory; and converting, at run-time, the object from the first class to the second class, the converting comprising changing the object layout, without changing the address associated with the object layout, and without changing any class layout of the plurality of class layouts.

In second embodiments, the present invention provides a system for converting, at run-time, a class of an object in an object-oriented programming environment, the system comprising:

means for providing a plurality of classes including a first class and a second class, the second class being any class of the plurality of classes;

means for providing a plurality of class layout data structures (class layouts), each class of the plurality of classes being associated with a class layout of the plurality of class layouts;

means for providing an object initially of the first class;

means for providing an object layout data structure (object layout), the object being associated with the object layout, and the object layout being associated with an address in a memory; and means for converting, at run-time, the object from the first class to the second class, the converting comprising changing the object layout, without changing the address associated with the object layout, and without changing any class layout of the plurality of class layouts.

In third embodiments, the present invention provides at least one program storage device readable by a machine, tangibly embodying at least one program of instructions executable by the machine to perform a method of converting, at run-time, a class of an object in an object-oriented programming environment, the method comprising:

providing a plurality of classes including a first class and a second class, the second class being any class of the plurality of classes;

providing a plurality of class layout data structures (class layouts), each class of the plurality of classes being associated with a class layout of the plurality of class layouts;

providing an object initially of the first class;

providing an object layout data structure (object layout), the object being associated with the object layout, and the object layout being associated with an address in a memory; and converting, at run-time, the object from the first class to the second class, the converting comprising changing the object layout, without changing the address associated with the object layout, and without changing any class layout of the plurality of class layouts.

In fourth embodiments, the present invention provides a method for deploying computing infrastructure, comprising integrating computer-readable code into a computing system, wherein the code in combination with the computing system is capable of performing a process of converting, at run-time, a class of an object in an object-oriented programming environment, said process comprising:

providing a plurality of classes including a first class and a second class, the second class being any class of the plurality of classes;

providing a plurality of class layout data structures (class layouts), each class of the plurality of classes being associated with a class layout of the plurality of class layouts;

providing an object initially of the first class;

providing an object layout data structure (object layout), the object being associated with the object layout, and the object layout being associated with an address in a memory; and converting, at run-time, the object from the first class to the second class, the converting comprising changing the object layout, without changing the address associated with the object layout, and without changing any class layout of the plurality of class layouts.

The present invention provides a dynamic run-time class conversion technique that decreases execution and space costs related to object operations. References to the object whose class is converted remains the same. Also, the class conversion technique claimed herein does not require class layouts to be modified or substituted. Further, the conversion technique provides in-place run-time class conversion, thereby avoiding temporary storage of class or object information and the complex programming and execution and space costs associated therewith.

BRIEF DESCRIPTION OF THE DRAWINGS

FIG. 10 depicts a table of examples of full implementation run-time class conversions of FIG. 4B, which employ the hierarchy of FIG. 2B, and which list types of intermediate full implementation conversions of FIGS. 5B, 6B, 7B & 8B needed for each example, in accordance with embodiments of the present invention.

DETAILED DESCRIPTION OF THE INVENTION

Figure 1:
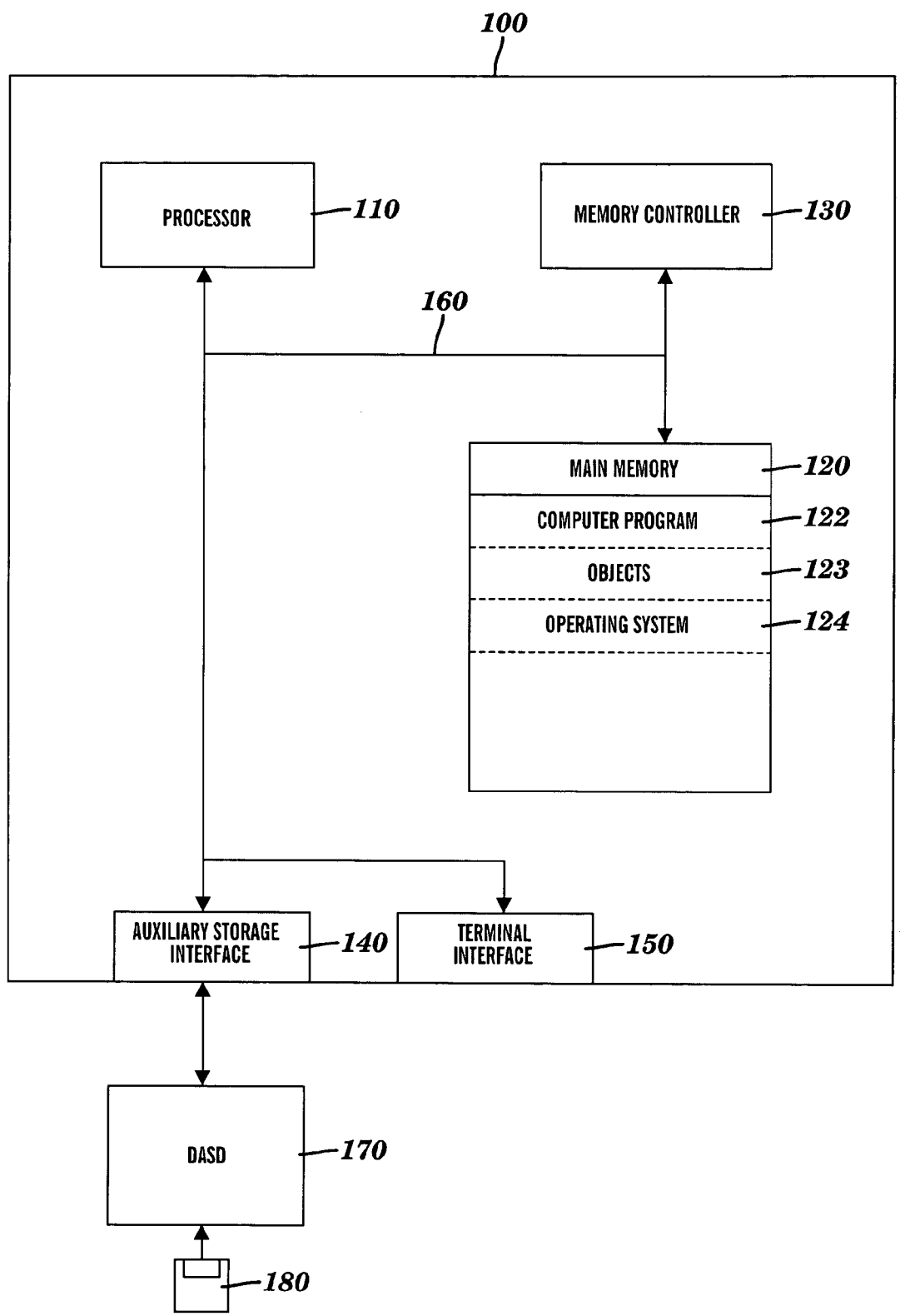
FIG. 1 is a block diagram of a system in accordance with embodiments of the present invention.

FIG. 1 is a block diagram of a system in accordance with embodiments of the present invention. A computer system 100 in accordance with the present invention is a ThinkCentre desktop personal computer offered by International Business Machines of Armonk, N.Y. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD-ROMs.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains one or more computer programs 122, a plurality of objects 123, and an operating system 124. Computer program 122 in memory 120 is used in its broadest sense, and includes any and all forms of computer programs, including source code, intermediate code, machine code, and any other representation of a computer program. Objects 123 are created and/or manipulated by some portion of computer program 122. Computer program 122 includes an algorithm for converting, at run-time, a class of an object from a first class to a second class, wherein the algorithm is in accordance with the class conversion method described below relative to FIGS. 3A, 3B, 4A & 4B.

It should be understood that main memory 120 will not necessarily contain all parts of all mechanisms shown. For example, portions of computer program 122 and operating system 124 may be loaded into an instruction cache (not shown) for processor 110 to execute, while other files may well be stored on magnetic or optical disk storage devices (not shown). In addition, although computer program 122 is shown to reside in the same memory location as operating system 124 and objects 123, it is to be understood that main memory 120 may consist of disparate memory locations.

As one example of the class conversion method described herein, an employee database system can be structured to include a class hierarchy containing classes such as Employee, Engineer, Technical Leader, Manager, Senior Manager, etc. Each class is associated with well-known properties (members of the class) and behaviors (methods or functions of the class) that are fully implemented before the system is running. While the database system is running, an Engineer may be promoted to a Technical Leader, or a Manager may become a Senior Manager, without any other change in the system. After one of these promotions occurs, an analysis of the system would show the same set of classes each having the same properties and behaviors.

The reference to the promoted employee also remains the same (e.g., the employee's ID and name do not change). In many cases of promotion, the employee's subordinates and supervisors remain the same, while he or she receives additional decision-making responsibilities. For example, a Technical Leader is not authorized to purchase certain types of hardware. This behavior of a Technical Leader would be programmed as "consult the supervisor" and a reference to the Technical Leader's supervisor would be included in the properties of the Technical Leader. Once the Technical Leader is promoted to Manager, he or she receives the hardware purchase authority and the set of behaviors is updated.

The above example can be mapped to an object-oriented environment. As used herein in an object-oriented programming context, "type" and "class" are used interchangeably. A class is a fundamental construct of an object-oriented programming language such as C++. A class groups its class members with functions that act on the members of the class. Class members are the data of the class and the associated functions are the methods of the class. More generally, the members and functions are referred to as the properties and behaviors, respectively, of the class. An object is an instance of a class, and includes one or more data members (e.g., variables) and one or more functions that operate on those data members.

Returning to the example above, the employee database is mapped to software object instances of the aforementioned classes in an object-oriented programming environment. The employee promotion triggers a type conversion (a.k.a. class conversion) during run-time. The employee class of an object representing the employee to be promoted is converted from a first class to a second class. The object's behaviors change to reflect the promotion, and its set of properties may or may not change. The reference to the object does not change. All other objects holding references to the converted object continue to use the same reference to the converted object.

More generally, the present invention provides a class conversion method that allows an object X of class A in an object-oriented programming system to be converted to object X of class B without changing anything else (e.g., class-related information) in the system, without changing references of object X, and without restarting a software application running in the system. For example, the class conversion methods described below require no new classes to be defined (e.g., as an extension of a previously defined class), nor do they require that one class is substituted for another class such that all objects associated with one class migrate to another class. Further, the class conversion methods described herein do not require that class or object information be stored temporarily in, for example, a temporary database, wherein the temporary storage is associated with a momentary interruption in the system or a restart of the system.

Figure 2A:
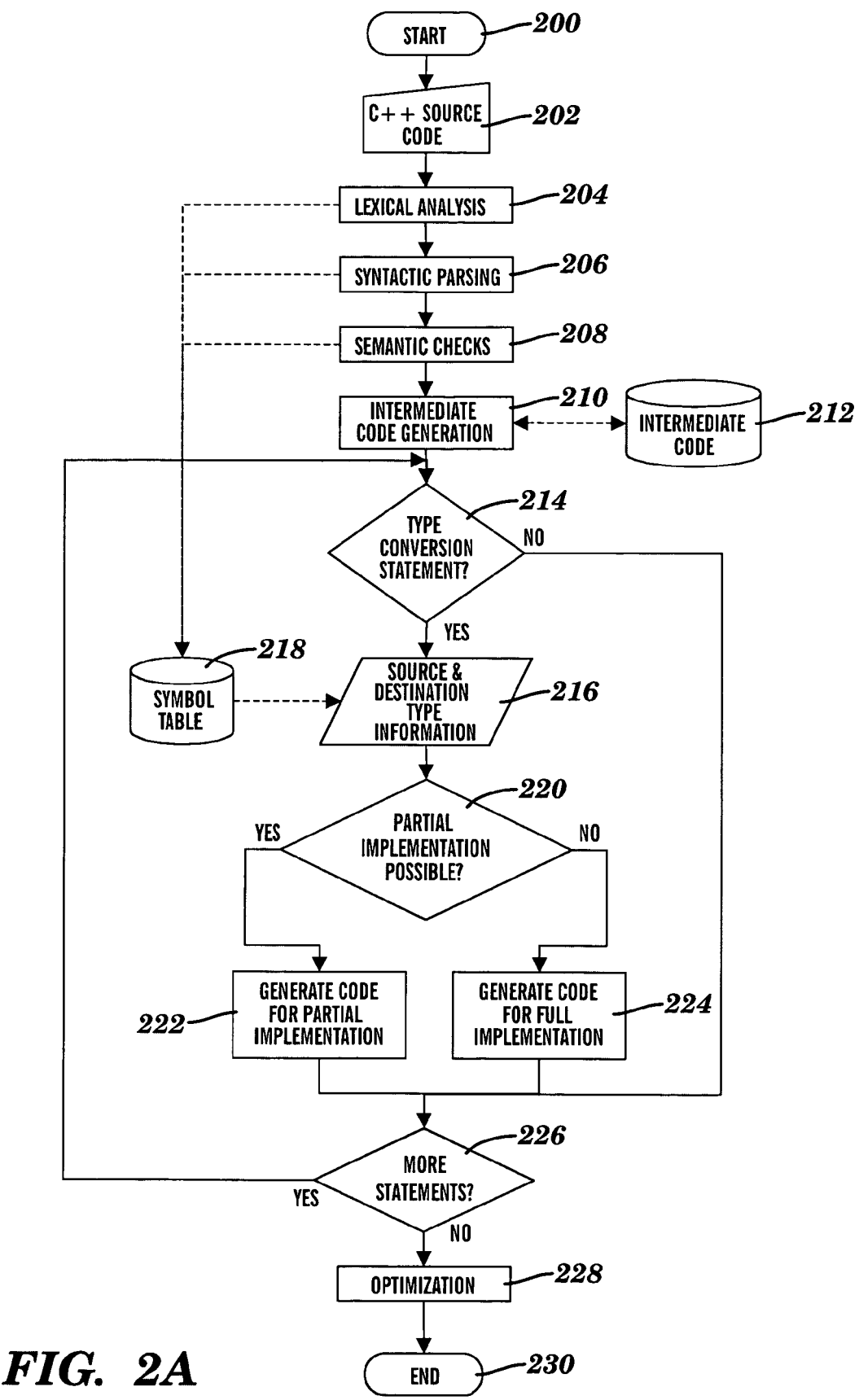
FIG. 2A is a flow chart showing an overview of a method of compiling object-oriented source code to generate machine-executable code for a partial implementation or a full implementation of a run-time conversion of a class in an object-oriented environment, in accordance with embodiments of the present invention.

The above employee database example can be implemented using the run-time type conversion method described in FIG. 2A and subsequent FIGS. 3A through 8B. FIG. 2A is a flow chart showing an overview of a method of compiling object-oriented source code to generate machine-executable code for a partial implementation or a full implementation of a run-time conversion of a class in an object-oriented environment, in accordance with embodiments of the present invention. This method starts in step 200 and C++ source code is input in step 202. It will be apparent to those skilled in the art that although C++ programming language examples are used herein, the method of converting classes at run-time, as claimed by the present invention, can be implemented by other object-oriented programming languages. Steps 204, 206, and 208 perform known C++ compilation steps of lexical analysis, syntactic parsing, and semantic checks, respectively.

Step 210 generates intermediate code, which is code represented by data structures chosen by a specific compiler, and which allows a compiler to quickly carry out various phases of compilation. The intermediate code is stored at location 212 for retrieval later in the compilation process. As the compiler analyzes each statement in the intermediate code, inquiry step 214 determines whether an intermediate code statement is a type conversion statement. If a type conversion statement is detected, type information relative to a source class and a destination class is determined in step 216 by reading class information from symbol table 218. As used herein, the source class is the class of the object prior to the start of the object's class conversion. Unless otherwise noted, as used herein, "the object" refers to the object whose class is to be converted, whose class is being converted, or whose class has been converted in response to the type conversion statement detected in step 214.

Inquiry step 220 determines if a partial implementation of the class conversion method is possible. Partial implementation is possible if the source and destination classes are polymorphic (e.g., the destination class is derived from the source class), and no additional memory is needed for the object's class conversion. As used herein, "additional memory is needed" if the amount of memory required by the destination class is greater than the amount of memory required by the source class. If partial implementation is possible in step 220, then machine-executable code for partial implementation is generated in step 222 (see discussion below relative to FIG. 3A). If partial implementation is not possible in step 220, then machine-executable code for a full implementation of the class conversion method is generated in step 224 (see discussion below relative to FIG. 4A). Following step 222 or step 224, or if a type conversion statement is not detected in step 214, inquiry step 226 determines if more intermediate code statements remain to be analyzed for the presence of a type conversion statement. If more statements remain, then the steps above repeat starting with step 214 determining if the next statement is a type conversion statement. Once inquiry step 226 determines that no more statements remain to be analyzed for type conversion, the code is optimized in step 228 and step 230 ends this part of the compilation process. Although not shown, if partial implementation is possible in step 220, full implementation code can be generated instead of the partial implementation code in step 222.

The syntax and semantics of the type conversion statement discussed above are illustrated by the following C++ code example that converts an object from class A to class B:

```
Class A;
Class B;   //B is polymorphic to A
B* ConvertObject (A* pObject, conversion_parameters);
```

Conversion parameters are any additional values that may be needed for initializing class B members. The A* supplied may not be numerically equal to the B* returned. An A* received as a result of static or dynamic typecasting from the returned B* is numerically equal to the supplied A*. The * operator is the known C++ dereference operator. A return value of NULL means either class B is not polymorphic to class A or the object cannot be converted at this time.

If the object was allocated on a heap using the conventional C++ operator new prior to calling ConvertObject, the conventional operator delete is invoked for class B and not for class A, thereby releasing occupied space.

ConvertObject can be an operator that is overloaded by the programmer. Alternatively, a new lexical convention at the class or object level can be introduced in the language to specify that objects of class A can be converted. In this case, the following C++ code provides an example of allowing the compiler to generate a default implementation of ConvertObject:

```
//class level attribute
convertible class A;   //All instances of A can be converted
A an_object;
//object level attribute
Class A;
convertible A an_object;   //an_object can be converted
```

Figure 2B:
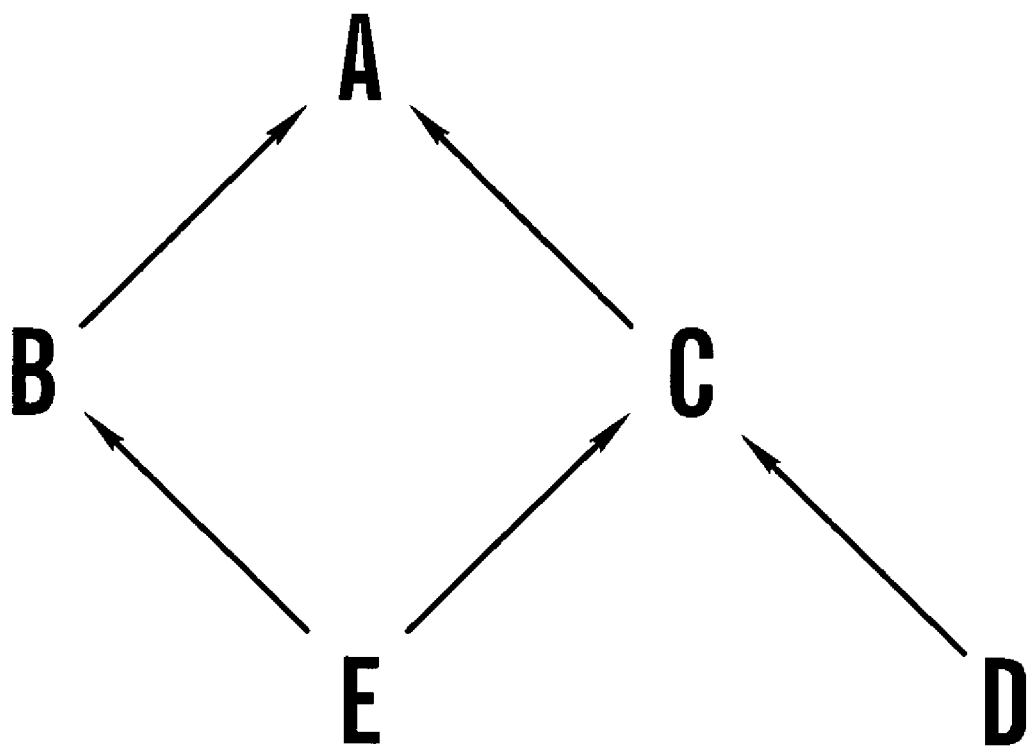
FIG. 2B depicts an example of a hierarchy that can be queried to determine a class hierarchy specific to a type conversion statement detected in FIG. 2A, in accordance with embodiments of the present invention.

FIG. 2B depicts an example of a hierarchy that can be queried to determine a class hierarchy specific to a type conversion statement detected in FIG. 2A, in accordance with embodiments of the present invention.

Partial Implementation

The partial implementation method of FIG. 2A can be used to convert an object of a first (source) class to a second (destination) class, if (1) the destination class is derived from the source class using single inheritance and not virtual inheritance; and (2) the destination class does not require more memory space than the amount of memory required by the source class. For example, condition (2) listed above is satisfied if the destination class does not define non-static members in addition to those members defined by the source class. A non-static member of a class is a member that can be associated with a particular object instance of the class, but not with the class as a whole. As used hereinafter, a destination class B being "polymorphic" to source class A means that condition (1) above is satisfied.

In the partial implementation method, the class conversion includes updating a reference to a v-table. A v-table (a.k.a. vee-table, vee table, or vtable) is a table of virtual functions. As used herein, a virtual function is a method of a class which is bound to an object at run-time. References (i.e., addresses or pointers) to a v-table are stored in class layouts and object layouts. A layout is a data structure stored in memory that determines the properties and behaviors of the class or object with which it is associated. The properties of a class layout include at least one class member and at least one pointer to a v-table. The virtual functions of the v-table referenced by the class's v-table pointer determine the behaviors of the class. The properties of an object layout include at least one data member (e.g., a variable with an assigned value) and at least one pointer to a v-table. The virtual functions of the v-table referenced by the object determine the run-time behaviors of that object. To convert an object from a source class to a destination class, the v-table pointer of the object is updated from referencing the v-table associated with the source class to referencing the v-table associated with the destination class. Thus, the behaviors of the object are updated from source class behaviors to destination class behaviors. The v-table pointer update can occur in a single step or in a series of updates in which each update changes the pointer from referencing an intermediate source class to referencing an intermediate destination class. Intermediate source and destination classes are discussed below with reference to FIG. 2B.

FIG. 2B depicts an example of a hierarchy that can be queried to determine a class hierarchy specific to a type conversion statement detected in FIG. 2A, in accordance with embodiments of the present invention. In the hierarchy of FIG. 2B, nodes named A through E represent a plurality of classes in an object-oriented environment. An arrow connecting a first class and a second class, wherein the arrow head points at the second class, indicates that the first class is derived from (i.e., is polymorphic to) the second class. In this case, the first class is a derived class and the second class is a base class. For example, since an arrow points from class E to class B, class E is derived from class B. The class hierarchy also illustrates single inheritance and multiple inheritance. A class is associated with single inheritance (or is "singly inherited") if it is derived from a single base class, and thus has only one arrow pointing away from it in the class hierarchy (e.g., class D is singly inherited from class C). A class is associated with multiple inheritance (or is "multiply inherited") if it is derived from multiple classes, and thus has multiple arrows pointing away from it (e.g., class E is multiply inherited from classes B and C).

The hierarchy of FIG. 2B also illustrates a "common parent" class relative to the class conversion method claimed herein. As used herein, a common parent class is the lowest class on a hierarchy of classes (organized as in FIG. 2B) which includes a member and/or function inherited by both the source class and the destination class determined by the type conversion statement detected in FIG. 2A. Using the hierarchy of FIG. 2B, class A is a common parent to class B and class D, and class C is a common parent to class E and class D. Note that "lowest" class refers to the class at the lowest level of a hierarchy of classes organized with derived classes located at a level lower than the base classes from which they are derived.

In FIGS. 3A, 3B, 4A, & 4B, the concept of traversing a class hierarchy is included in the partial and full implementation class conversions described. As used herein, traversals can occur upward or downward relative to a source and destination class determined by a type conversion statement of FIG. 2A. If a class hierarchy is traversed upward, the traversal includes a series of one or more steps, wherein a pair of classes is considered in each step. One class in the pair is the intermediate source class and the other class in the pair is the intermediate destination class. The intermediate source class is derived from the intermediate destination class. A traversal upward begins with the source class as the first intermediate source class, and ends when the intermediate destination class is the common parent class. If the end condition has not yet been satisfied, a next pair of classes is considered, with the intermediate source class of the next pair being the intermediate destination class of the previous pair. This step of considering a next pair is repeated until the common parent is reached. For example, using the hierarchy in FIG. 2B, if D is the source class and B is the destination class, the common parent is class A, and the traversal upward includes class D and class C as the first pair of intermediate source and intermediate destination classes, respectively, and class C and class A as the second and final pair.

If a class hierarchy is traversed downward, the traversal includes a series of one or more steps, wherein a pair of classes is considered in each step. One class in the pair is the intermediate source class and the other class in the pair is the intermediate destination class. In this case, the intermediate destination class is derived from the intermediate source class. A traversal downward begins with the common parent class as the first intermediate source class, and ends when the intermediate destination class is the destination class, the destination class being determined by the type conversion statement. If the end condition has not yet been satisfied, a next pair of classes is considered, with the intermediate source class of the next pair being the intermediate destination class of the previous pair. This step of considering a next pair is repeated until the destination class is reached. For example, using the hierarchy in FIG. 2B, if B is the source class and D is the destination class, the common parent is class A, and the traversal downward includes class A and class C as the first pair of intermediate source and intermediate destination classes, respectively, and class C and class D as the second and final pair.

Figure 3A:
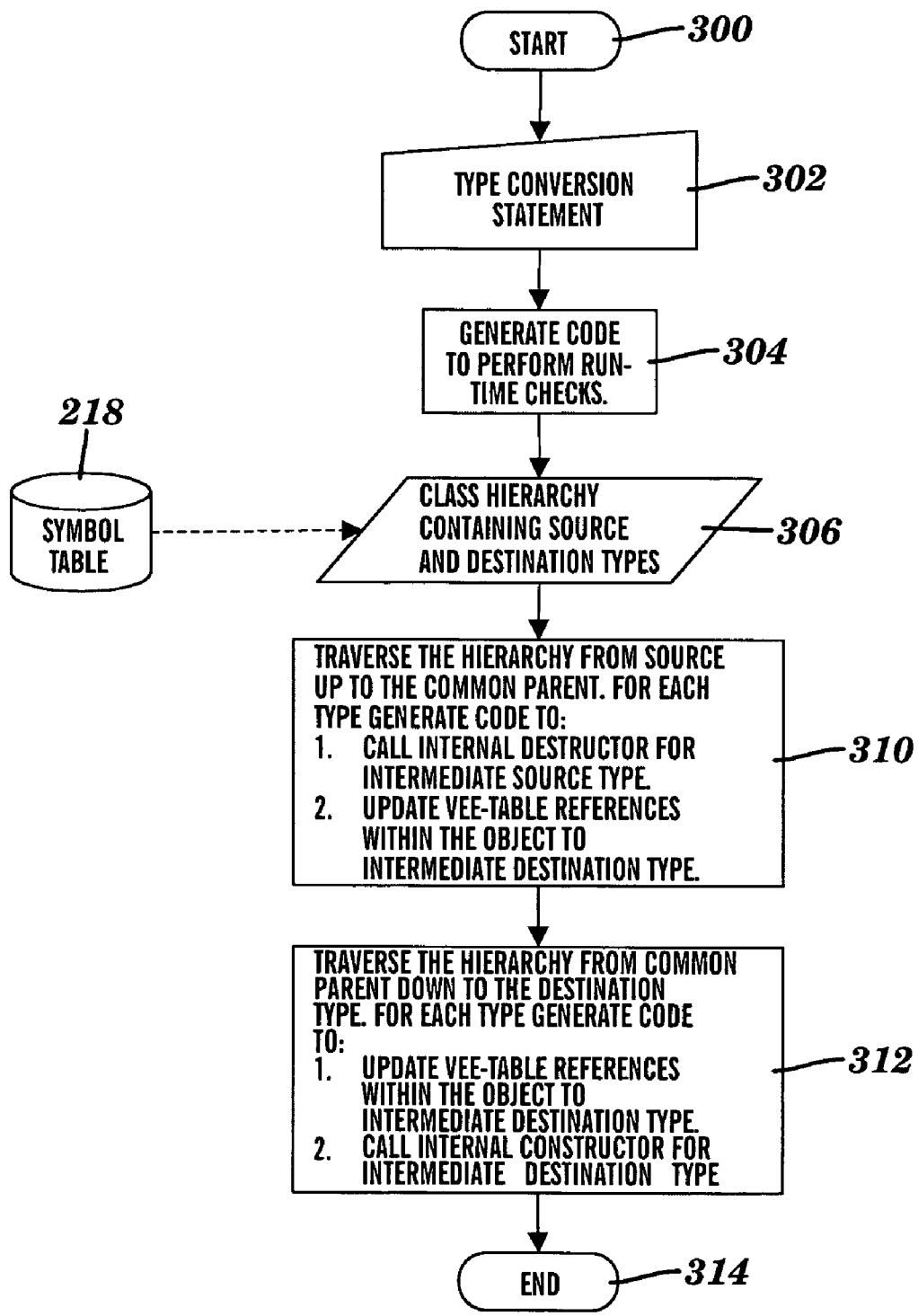
FIG. 3A is a flow chart showing a compile time method of generating the code to perform the partial implementation of FIG. 2A, in accordance with embodiments of the present invention.

FIG. 3A is a flow chart showing a compile time method of generating the code to perform the partial implementation of FIG. 2A, in accordance with embodiments of the present invention. This compile time partial implementation method starts at step 300, and a type conversion statement is input at step 302. The type conversion statement was detected at step 214 (FIG. 2A). The type conversion statement indicates the object to be converted, as well as a source class and a destination class. The destination class can be any class defined in the object-oriented programming environment. The destination class is not required to be a specially-defined class, such as a new class that extends the properties of an existing class. In step 304, code is generated to perform run-time checks. These run-time checks are discussed below relative to FIG. 3B. In step 306, a class hierarchy is determined from reading class configuration information from symbol table 218. The class hierarchy determined in step 306 indicates derived and base classes from the source class to the common parent class and from the common parent class to the destination class. An example of a class hierarchy is a subset of the hierarchy depicted in FIG. 2B. For instance, if the type conversion statement indicates that class B of FIG. 2B is the source class and class D of FIG. 2B is the destination class, then the class hierarchy determined is the subset of FIG. 2B including classes B, A, C and D, and their derivation relationships, as depicted in FIG. 2B.

Step 310 traverses the class hierarchy upward from the source class to the common parent class, according to the description above. Step 310 also generates, for each pair of classes considered in the traversal upward, machine-executable code to (1) invoke an internal destructor for the intermediate source type, and (2) update any v-table references within the object to reference the intermediate destination class. A destructor is a known C++ special class member function that frees memory resources. A destructor that is internal does not cascade destructor calls to base classes, and is known to the compiler but is not visible to a programmer.

In step 312, the class hierarchy is traversed downward from the common parent class to the destination class. Also in step 312, for each pair of classes considered in the traversal downward, machine-executable code is generated to (1) update any v-table references within the object to reference the intermediate destination class; and (2) invoke an internal constructor for the intermediate destination type. As used herein, a constructor is a class member function that creates and initializes objects of a class, and obtains memory resources. For any class, more than one constructor can be defined. If there is ambiguity as to which constructor to call, the ambiguity is resolved by conversion parameters in, for example, the type conversion statement. As used herein, an internal constructor is a constructor, as defined above, that does not cascade constructor calls to base classes, and is visible to the compiler but is not visible to a programmer.

Although the constructor and destructor functions used in the examples that follow are C++ special class member functions, it is clear to one skilled in the art that any object-oriented programming language that can implement functions with the aforementioned characteristics can be used instead of C++.

Figure 3B:
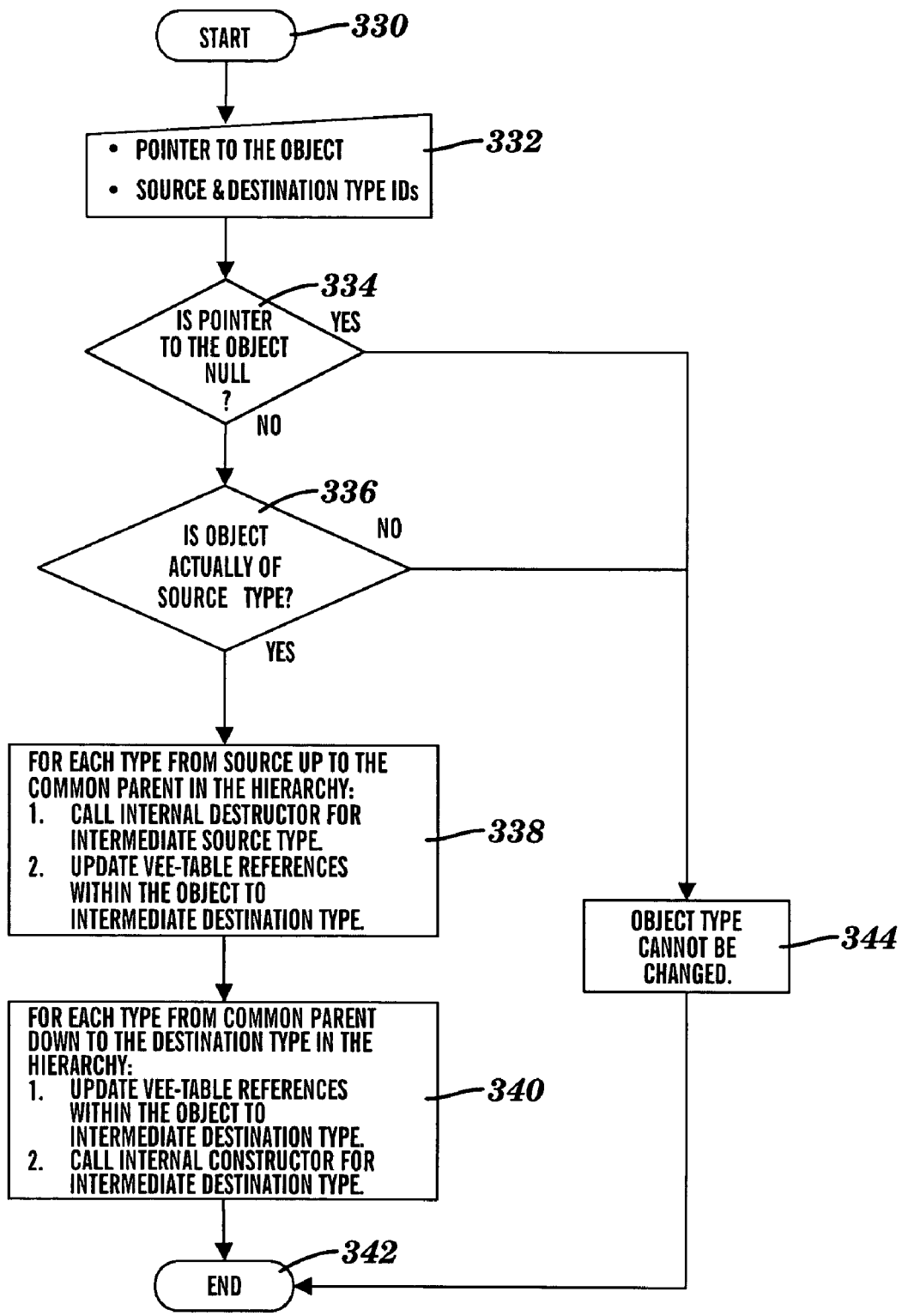
FIG. 3B is a flow chart showing a run-time method of executing the code generated in FIG. 3A to perform the partial implementation of FIG. 2A, in accordance with embodiments of the present invention.

FIG. 3B is a flow chart showing a run-time method of executing the code generated in FIG. 3A to perform the partial implementation of FIG. 2A, in accordance with embodiments of the present invention. This partial implementation run-time method starts at step 330 and uses in step 332 input comprising a pointer to the object to be converted, as well as source and destination type IDs. For example, type IDs can be obtained with a C++ typeid operator which operates on an object rather than on a class, and which obtains an object's type information at run-time. Inquiry steps 334 and 336 are the run-time checks referenced in step 304 of FIG. 3A. In step 334, the pointer to the object is checked to determine if the pointer to the object is NULL. If the pointer is not NULL, step 336 determines if the object is actually of the source class. This determination includes checking if the object is of the source class and not polymorphic to the source class. If the object is of the source class according to step 336, the class hierarchy determined in step 306 of FIG. 3A is traversed upward in step 338. For each pair of intermediate source class and intermediate destination class, an internal destructor is called for the intermediate source type and v-table references within the object are updated to reference the intermediate destination class. As used herein, a destructor is a class function that frees memory allocated to an object. Although the destructors used in the code examples that follow are C++ special member functions, any object-oriented programming language that offers a function with the aforementioned characteristics can be used. As used herein, an internal destructor is a destructor, as defined above, that does not cascade destructor calls to base classes, and is visible to the compiler but is not visible to a programmer. Step 340 traverses the class hierarchy downward. For each pair of intermediate source class and intermediate destination class in the downward traversal, v-table references within the object are updated to reference the intermediate destination class and an internal constructor is called for the intermediate destination class. Following steps 338 and 340, the v-table reference is completely updated from referencing the source class to referencing the destination class, thereby converting the class of the object from the source to the destination class. Again, this class conversion is accomplished without changing the address of the object layout and without changing any class layouts with modifications or substitutions. Thus, references to the object can be retained, and performance degradation related to changing class layouts is avoided or decreased. Finally, the partial implementation run-time method ends at step 342. Returning to inquiry steps 334 and 336, if the pointer to the object is NULL (step 334) or if the object is not actually of the source class (step 336), then the object type cannot be converted in step 344 and the partial implementation run-time process ends at step 342.

The following pseudo-code can be used to implement the above-described partial implementation of run-time type conversion. As an example, this pseudo-code converts an object of class B to class C, which are classes in the sample class hierarchy shown in FIG. 2B.

```
// Common routines for partial implementation
void update_all_vee_table_references(void * pObj, type_info &src,
                                                  type_info &dst)
{
    // updates all VEE table references within 'pObj' of type 'src'
    // with those for type 'dst'
}
int offset(type_info &src, type_info &dst)
{
    // returns (positive/negative) offset for an object
    // of type 'dst' with respect to an object of type 'src'
}
// Run time type conversion - Partial implementation
// Converts an object of class B to class C
// Input:    pObject - pointer to the object
//           conversion_parameters - additional optional input
// Output:   returns NULL on failure, else pointer to the converted
//           object
C * ConvertObject(B * pObject, conversion_parameters)
{
    if (NULL == pObject)
    {
        // nothing to convert
        return NULL;
    }
    if (typeid(B) != typeid(*pObject))
    {
        // the object should be of class B and NOT
        // polymorphic to class B
        return NULL;
    }
    // invoke INTERNAL destructor for class B
    pObject->B::~B( );
    A * pObjectA = pObject + offset(typeid(B), typeid(A));
    update_all_vee_table_references(pObjectA, typeid(B), typeid(A));
    update_all_vee_table_references(pObjectA, typeid(A), typeid(C));
    // Compiler will generate two statements to update the
    // VEE Table references even if the first one is redundant.
    // However, this will be removed out during optimization phase.
    // This pseudo code still shows two statements for the sake of
    // simplicity.
    // invoke INTERNAL constructor for class C
    C * pObjectC = pObjectA + offset(typeid(A), typeid(C));
    pObjectC->C::C(conversion_parameters);
    return pObjectC;
}
```

Full Implementation

The partial implementation method described above cannot be used if the amount of memory required by the destination class exceeds the amount of memory required by the source class. In this case, the full implementation class conversion method of FIG. 2A is applicable if the additional memory required by the destination class is allocated to the object whose class is to be converted. The full implementation method exploits the fact that since the entire class hierarchy definition is available at the time of compilation, extra memory space can be allocated to an object whenever that object is instantiated.

When a class B is derived from a class A, extra space allocated to a class B object may be before or after the contained class A object. Assuming there is a single root in the class hierarchy, the following algorithm provides the total space to be allocated for the object whose class is to be converted:

```
max_top = 0, max_bottom = 0
for each class in the class hierarchy, do
    1. update max_top with maximum of max_top and extra space in
       the object above the topmost base class object.
    2. update max_bottom with maximum of max_bottom and extra
       space in the object below the topmost base class object.
Assign memory space of max_top + size of topmost base class +
max_bottom to every object in the class hierarchy.
```

If the class hierarchy contains multiple root classes, an enhanced version of the above algorithm is required. The extra space at the top and bottom can be initialized using the conversion parameters.

Figure 4A:
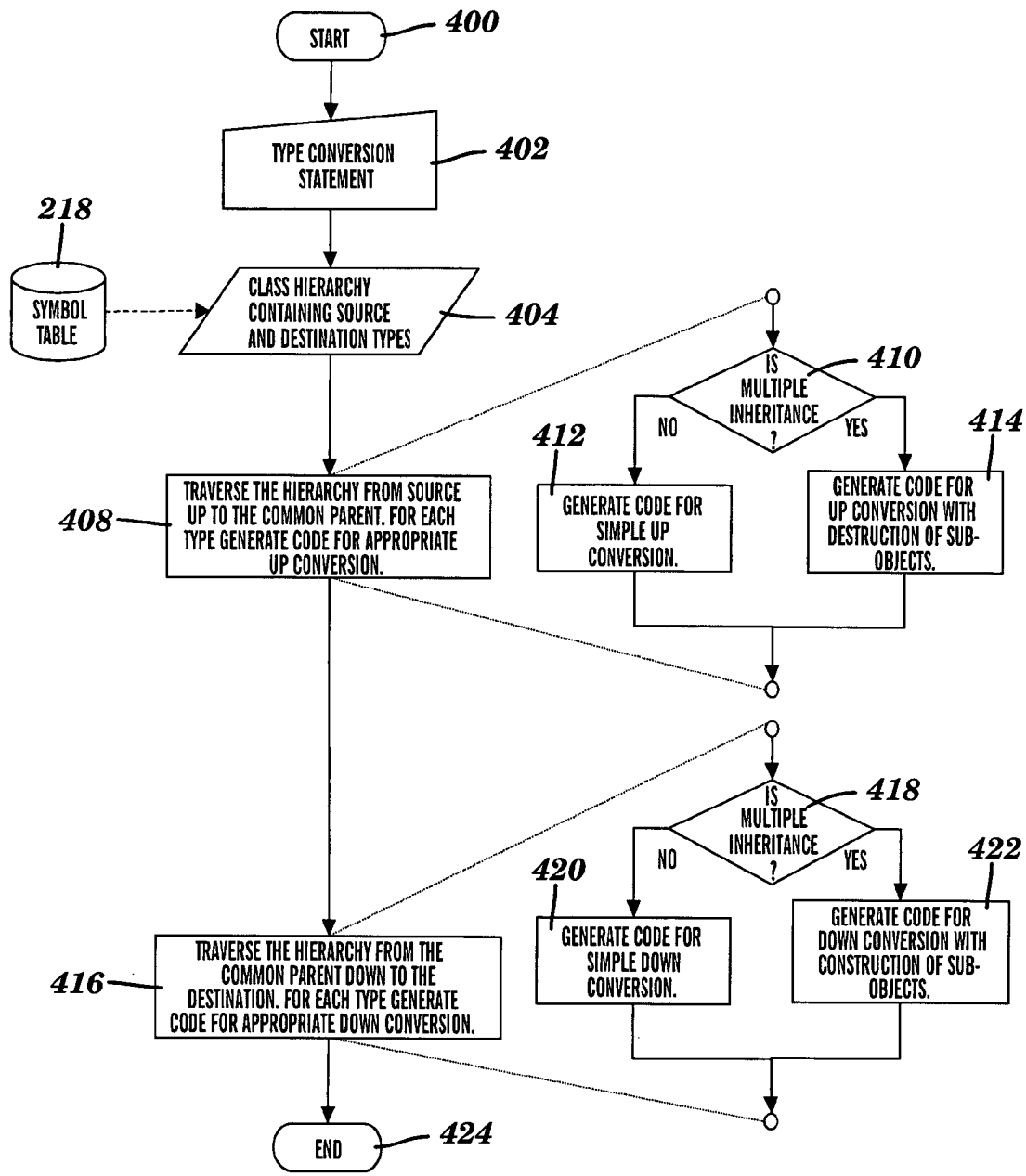
FIG. 4A is a flow chart showing a compile time method of generating the code to perform the full implementation of FIG. 2A, the generated code including code for a simple up conversion, an up conversion with a destruction of sub-objects, a simple down conversion, and/or a down conversion with a construction of sub-objects, in accordance with embodiments of the present invention.

FIG. 4A is a flow chart showing a compile time method of generating the code to perform the full implementation of FIG. 2A, the generated code including code for a simple up conversion, an up conversion with a destruction of sub-objects, a simple down conversion, and/or a down conversion with a construction of sub-objects, in accordance with embodiments of the present invention. This compile time full implementation method starts at step 400 with input of a type conversion statement 402, which was detected at step 214 of FIG. 2A. The type conversion statement indicates the object whose class is to be converted, a source class and a destination class. Again, the destination class can be any class defined in the object-oriented programming environment. The destination class is not required to be a specially-defined class, such as a new class that extends the properties of an existing class. Step 404 determines a class hierarchy for the type conversion statement by reading class configuration information in symbol table 218. The class hierarchy determined in step 404 indicates derived and base classes from the source class to the common parent class and from the common parent class to the destination class. An example of a class hierarchy is a subset of the hierarchy depicted in FIG. 2B, as described above relative to FIG. 3A.

Step 408 traverses the class hierarchy upward starting at the source class and ending at the common parent class. For each pair of intermediate source and intermediate destination classes on the traversal upwards, inquiry step 410 determines if multiple inheritance exists at the intermediate source class. If such multiple inheritance does not exist, code for a simple up conversion is generated at step 412. On the other hand, if multiple inheritance is detected at the intermediate source class at step 410, code for an up conversion with destruction of sub-objects is generated at step 414. As used herein, a sub-object within a class A is an object of a base class relative to class A. For example, in FIG. 2B, class C is a base class to class E, so an object of class C is a sub-object within E. Note that "sub" in sub-object does not refer to a lower level in a hierarchy such as the one depicted in FIG. 2B.

Following the upward traversal in step 408, the class hierarchy is traversed downward in step 416, starting at the common parent class and ending at the destination class. For each pair of intermediate source class and intermediate destination class in the downward traversal, inquiry step 418 determines if multiple inheritance exists at the intermediate destination class. If such multiple inheritance does not exist, code for a simple down conversion is generated in step 420. If multiple inheritance does exist at step 418, code for a down conversion with construction of sub-objects is generated in step 422. After completing the downward traversal in step 416, which includes the code generation in step 420 or step 422, the compile time full implementation method ends at step 424.

Figure 4B:
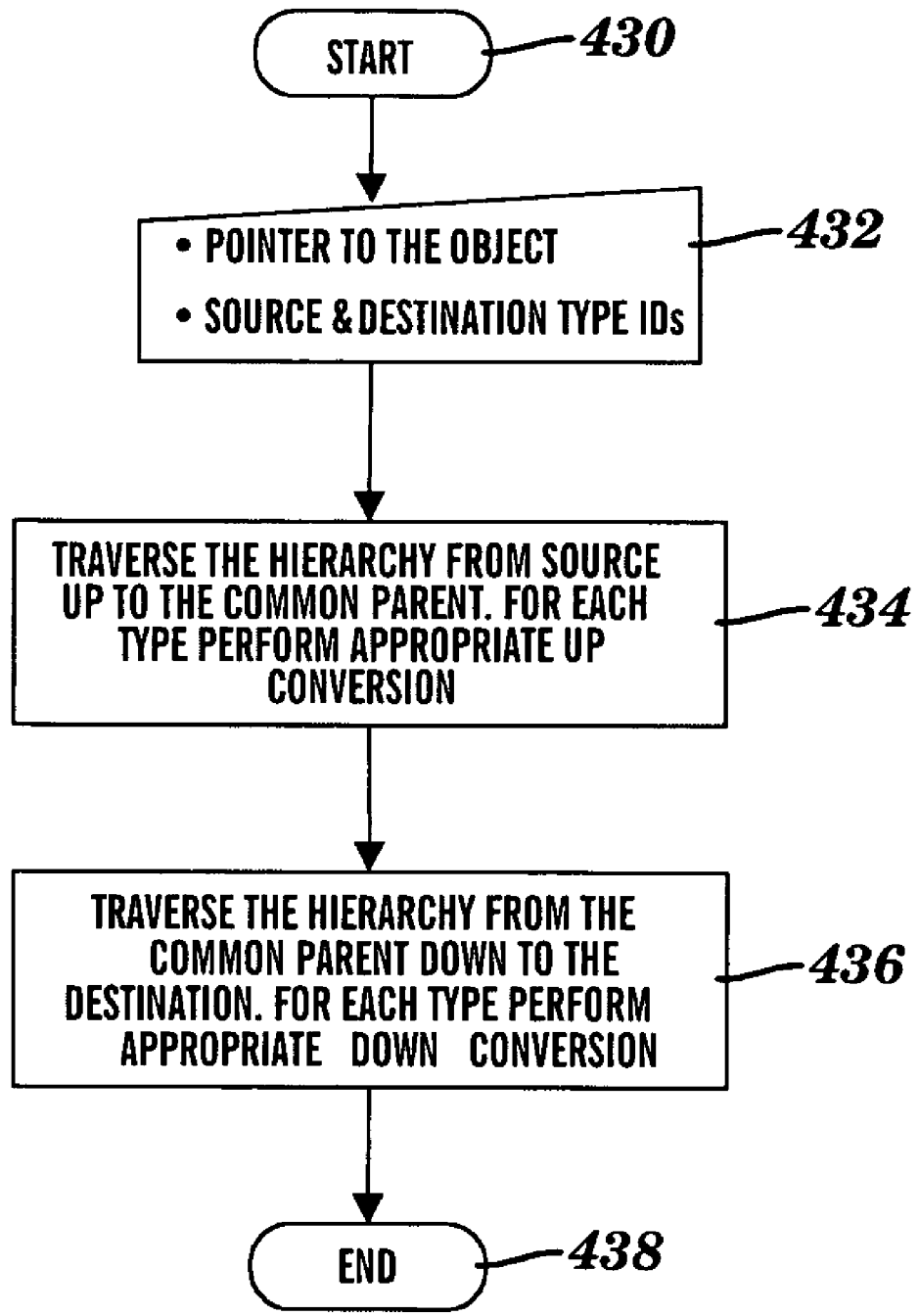
FIG. 4B is a flow chart showing a run-time method of executing the code generated in FIG. 4A to perform the full implementation of FIG. 2A, in accordance with embodiments of the present invention.

FIG. 4B is a flow chart showing a run-time method of executing the code generated in FIG. 4A to perform the full implementation of FIG. 2A, in accordance with embodiments of the present invention. This full implementation run-time method starts at step 430 and includes as input 432 a pointer to the object and type IDs for the source and destination classes. The class hierarchy determined in FIG. 4A is traversed upward in step 434 from the source class to the common parent class. For each pair of intermediate source and destination classes, the appropriate up conversion is performed by executing the code generated in step 412 or step 414 of FIG. 4A. Next, the class hierarchy determined in FIG. 4A is traversed downward in step 436 from the common parent class to the destination class. For each pair of intermediate source and destination classes, an appropriate down conversion is performed by executing the code generated in step 420 or step 422 of FIG. 4A. After traversing downward in step 436, the run-time full implementation method ends at step 438.

Figure 5A:
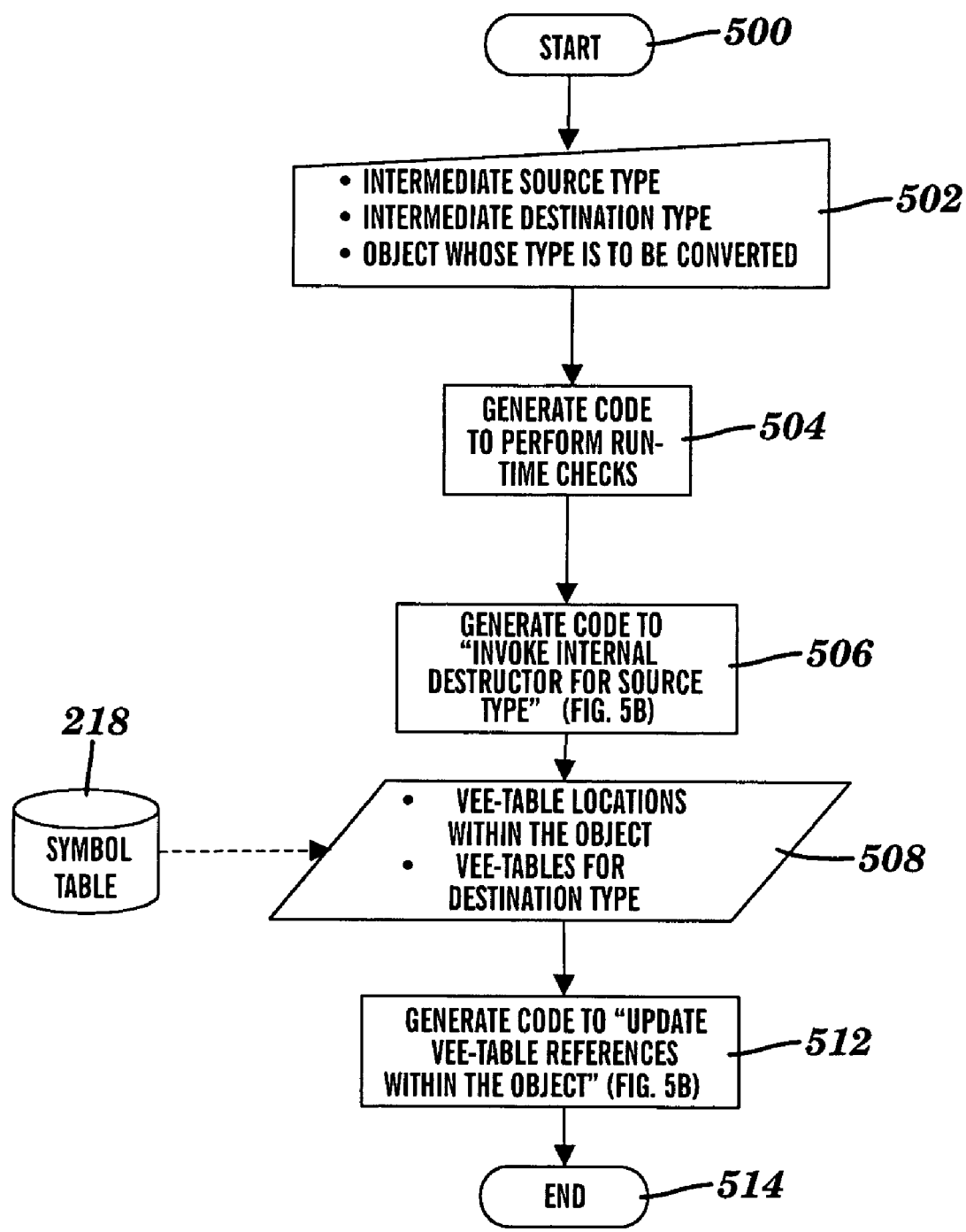
FIG. 5A is a flow chart showing a compile time method of generating the simple up conversion code of FIG. 4A, in accordance with embodiments of the present invention.

FIG. 5A is a flow chart showing a compile time method of generating the simple up conversion code of FIG. 4A, in accordance with embodiments of the present invention. Compile time simple up conversion starts at step 500 with an intermediate source class, an intermediate destination class and the object whose class is to be converted as input 502. Code is generated at step 504 to perform run-time checks. In step 506, code is generated to invoke an internal destructor for the intermediate source class. V-table locations within the object and v-tables for the intermediate destination class are determined in step 508 using class information read from symbol table 218. Step 512 generates code to update v-table references within the object. The compile time simple up conversion method ends in step 514. The run-time checks, the invocation of the internal destructor and the updating of v-table references are described below relative to FIG. 5B.

Figure 5B:
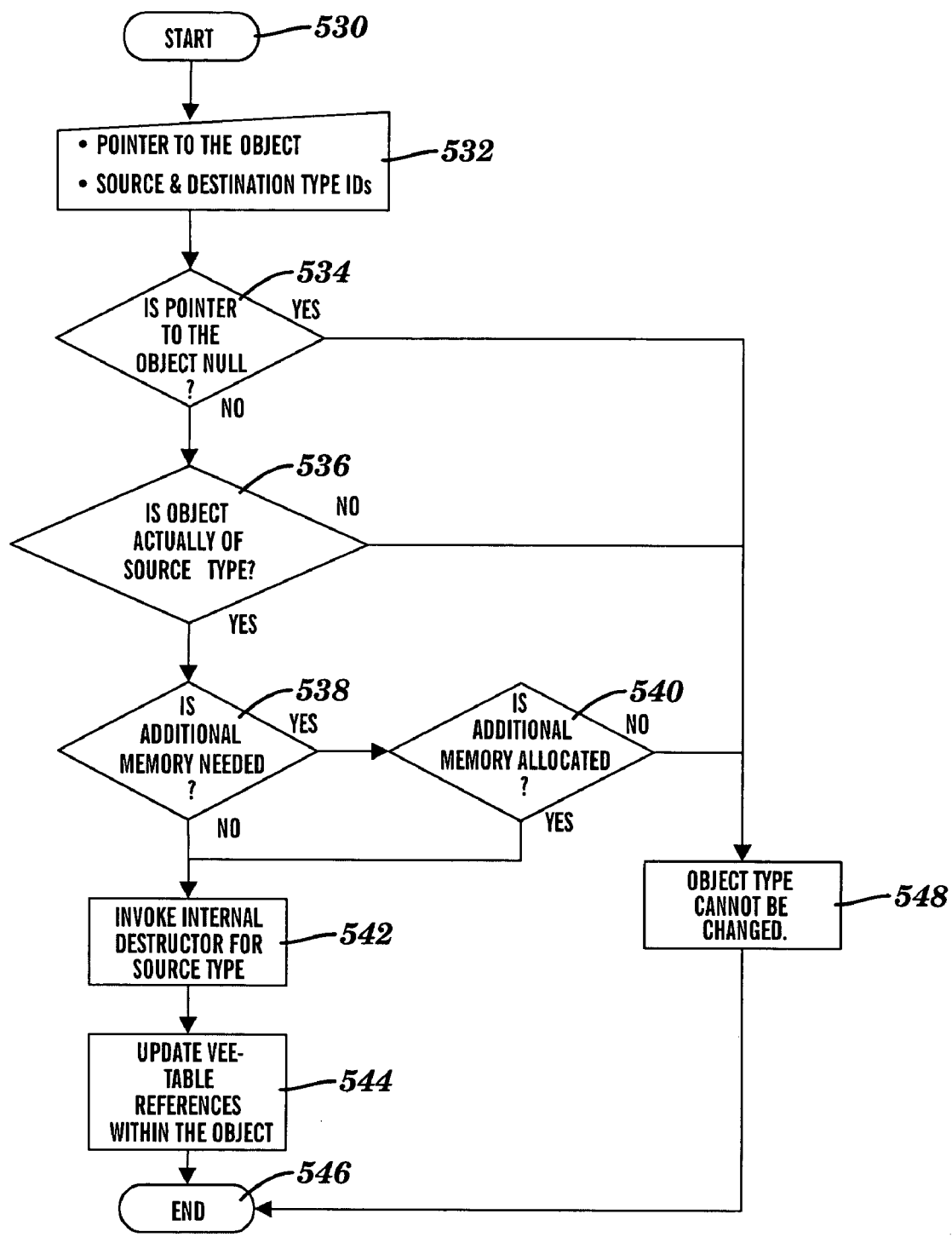
FIG. 5B is a flow chart showing a run-time method of executing the code of FIG. 5A to perform the simple up conversion of FIG. 4A, in accordance with embodiments of the present invention.

FIG. 5B is a flow chart showing a run-time method of executing the code of FIG. 5A to perform the simple up conversion of FIG. 4A, in accordance with embodiments of the present invention. The run-time simple up conversion starts in step 530 and includes a pointer to the object, as well as type IDs for the intermediate source and intermediate destination classes as input 532. Steps 534, 536, 538 and 540 are the run-time checks referenced in FIG. 5A. Inquiry step 534 determines if the pointer to the object is NULL. If the pointer to the object is not NULL, inquiry step 536 determines if the object is of the intermediate source class. If the object is of the intermediate source class, inquiry step 538 determines if the intermediate destination class requires more memory than is required by the intermediate source class (i.e., if additional memory is needed). If additional memory is needed in step 538, inquiry step 540 determines if the additional memory needed is allocated to the object. If step 540 determines that the additional memory is allocated, or if step 538 determines that the additional memory is not needed, then step 542 invokes an internal destructor for the intermediate source class. In step 544, v-table references are updated within the object to reference the intermediate destination class and the run-time simple up conversion method ends in step 546. Returning to the run-time checks of FIG. 5B discussed above, if the pointer to the object is NULL in step 534, if the object is not of the intermediate source class in step 536, or if additional memory is needed in step 538 and additional memory is not allocated, as determined in step 540, then the class of the object cannot be converted, step 548, and this run-time method ends in step 546.

The following pseudo-code includes common routines that can be used to implement aspects of the simple up conversion described above relative to FIGS. 5A & 5B. This code similarly applies to implementations of other kinds of full implementation type conversion, which are discussed below relative to FIGS. 6A, 6B, 7A, 7B, 8A and 8B.

```
// Common routines for full implementation
bool is_additional_memory_needed_for_conversion(type_info &src,
                                                 type_info &dst)
{
    // returns true if an object of type 'dst' needs more memory than
    // an object of type 'src'
    // note that merely checking for sizeof(src) and sizeof(dst)
    // is not sufficient, since there could be some alignment or
    // padding before or after 'src'
}
bool is_additional_memory_allocated(void * pObj, type_info &src,
                                     type_info &dst)
{
    // returns true if block of memory pointed to by 'pObj',
    // containing the object of type 'src' is sufficiently sized to
    // hold an object of type 'dst'
    // note that a programmer may not have instantiated 'pObj' with
    // the convertible attribute in order to have good feasibility
    // in terms of space requirements
}
void update_all_vee_table_references(void * pObj, type_info &src,
                                      type_info &dst)
{
    // updates all VEE table references within 'pObj' of type 'src'
    // with those for type 'dst'
}
int offset(type_info &src, type_info &dst)
{
    // returns (positive/negative) offset for an object
    // of type 'dst' with respect to an object of type 'src'
}
```

The common routines shown above and the following pseudo-code can be used to implement the above-described simple up conversion method. As one example, the following pseudo-code converts an object of class B to class A, wherein class A and class B are shown in the hierarchy of FIG. 2B.

```
// Simple Up Conversion
// Converts an object of class B to class A
// Input:    pObject - pointer to the object
//           conversion_parameters - additional optional input
// Output:   returns NULL on failure, else pointer to the converted
//           object
A * ConvertObject(B * pObject, conversion_parameters)
{
    if (NULL == pObject)
    {
        // nothing to convert
        return NULL;
    }
    if (typeid(B) != typeid(*pObject))
    {
        // the object should be of class B and NOT
        // polymorphic to class B
        return NULL;
    }
    if (is_additional_memory_needed_for_conversion( typeid(B),
                                                    typeid(A)))
    {
        if (!is_additional_memory_allocated(pObject, typeid(B),
                                            typeid(A)))
        {
            // additional memory needed for class A may not have
            // been allocated for pObject during its construction
            return NULL;
        }
    }
    // invoke INTERNAL destructor for class B
    // INTERNAL destructors do not in turn invoke destructors
    // for base classes, and are visible only to compilers
    pObject->B::~B( );
    A * pObjectA = pObject + offset(typeid(B), typeid(A));
    update_all_vee_table_references(pObjectA, typeid(B), typeid(A));
    return pObjectA;
}
```

Figure 6A:
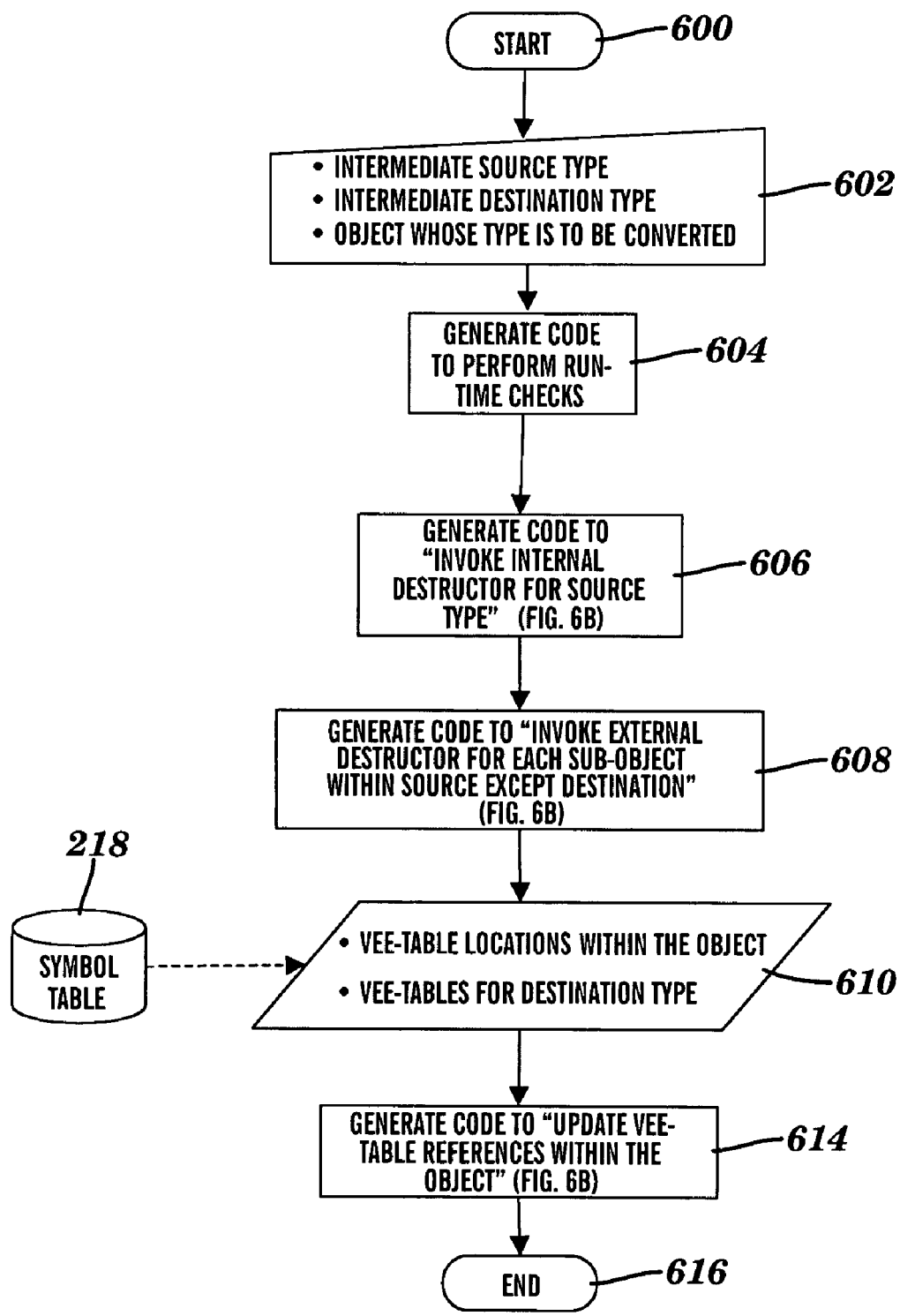
FIG. 6A is a flow chart showing a compile time method of generating the code for the up conversion with destruction of sub-objects of FIG. 4A, in accordance with embodiments of the present invention.

FIG. 6A is a flow chart showing a compile time method of generating the code for the up conversion with destruction of sub-objects of FIG. 4A, in accordance with embodiments of the present invention. This compile time code generation for the up conversion with destruction starts at step 600 with an intermediate source class, an intermediate destination class and the object whose class is to be converted as input 602. Step 604 generates code to perform run-time checks, which are described below relative to FIG. 6B. Step 606 generates code to invoke an internal destructor for the intermediate source class. Code is then generated, in step 606, to invoke an external destructor for each sub-object within the intermediate source class, but not including the intermediate destination class. As used herein, an external destructor is a destructor that is visible to a programmer and which cascades destructor calls to base classes. A "destructor" is defined above relative to the FIG. 3A discussion. In step 610, v-table locations within the object and v-tables for the destination class are determined by reading class information from symbol table 218. Step 614 generates code to update v-table references within the object to reference the intermediate destination class. The compile time method for up conversion with destruction ends in step 616. The code generated in steps 606, 608 and 614 is further described below with reference to FIG. 6B.

Figure 6B:
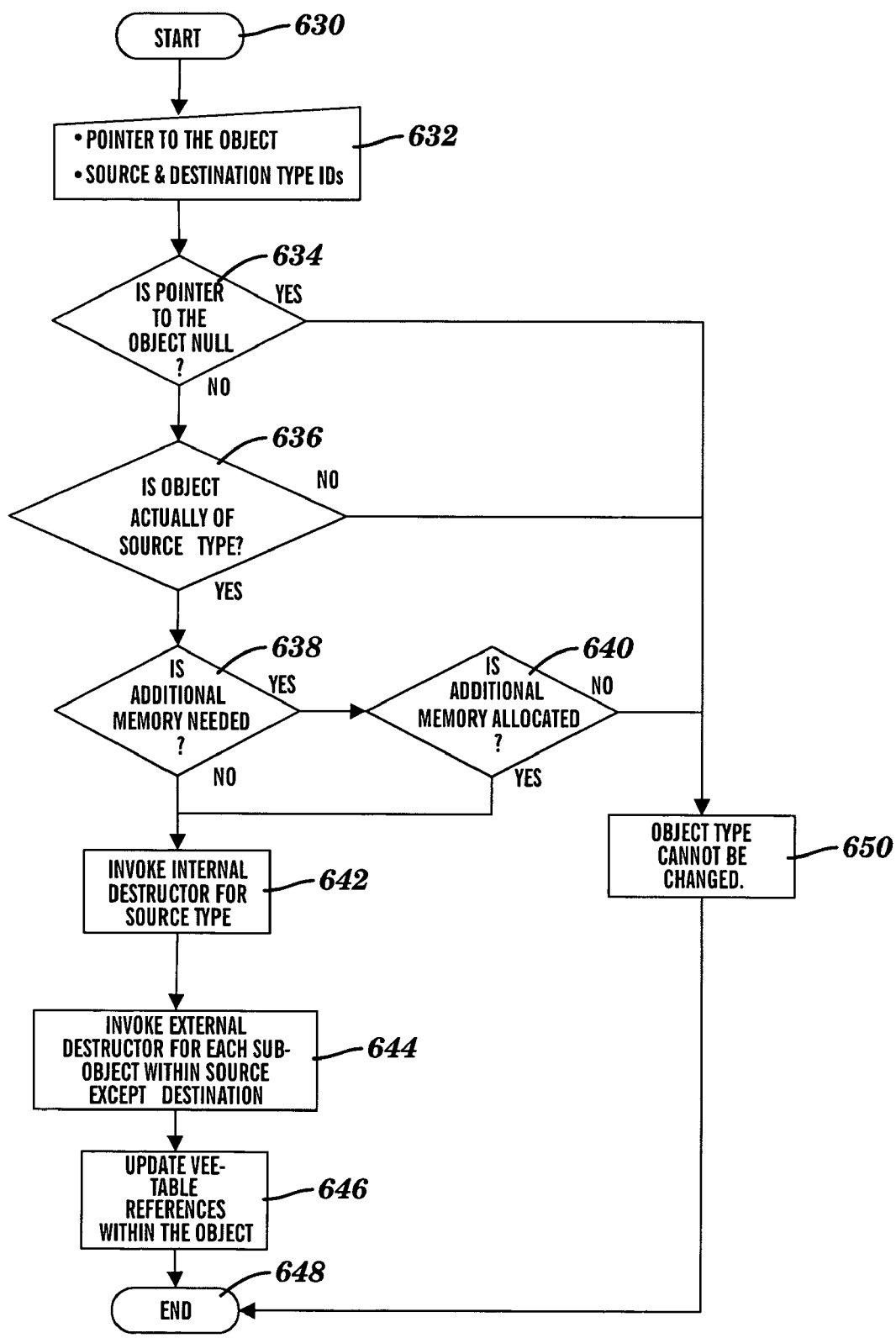
FIG. 6B is a flow chart showing a run-time method of executing the code of FIG. 6A to perform the up conversion with destruction of sub-objects of FIG. 4A, in accordance with embodiments of the present invention.

FIG. 6B is a flow chart showing a run-time method of executing the code of FIG. 6A to perform the up conversion with destruction of sub-objects of FIG. 4A, in accordance with embodiments of the present invention. This run-time method for performing up conversion with destruction starts at step 630 and includes a pointer to the object and type IDs for the intermediate source and intermediate destination classes as input 632. Steps 634, 636, 638 and 640 are the run-time checks referenced in FIG. 6A. Inquiry step 634 determines if the pointer to the object is NULL. If the pointer to the object is not NULL, inquiry step 636 determines if the object is of the intermediate source class. If the object is of the source class, inquiry step 638 determines if the intermediate destination class requires more memory than the intermediate source class (i.e., if additional memory is needed). If additional memory is needed in step 638, inquiry step 640 determines if the additional memory needed is allocated to the object. If the additional memory is allocated in step 640, or if additional memory is not needed in step 638, step 642 invokes an internal destructor for the intermediate source class. Step 644 invokes an external destructor for each sub-object within the intermediate source class, but not including the intermediate destination class. Finally, in step 646, v-table references are updated within the object to reference the intermediate destination class and the run-time up conversion with destruction ends at step 648. Returning to the run-time checks of FIG. 6B discussed above, if the pointer to the object is NULL in step 634, if the object is not of the intermediate source class in step 636, or if additional memory is needed in step 638 and additional memory is not allocated in step 640, then the class of the object cannot be converted, in step 650, and this run-time method ends at step 648.

The following pseudo-code can be used to implement the up conversion with destruction method discussed above. As one example, this pseudo-code converts an object of class E to class B in the hierarchy depicted in FIG. 2B.

```
// Up conversion with destruction of remaining sub-objects
// Converts an object of class E to class B
// Input:    pObject - pointer to the object
//           conversion_parameters - additional optional input
// Output:   returns NULL on failure, else pointer to the converted
//           object
B * ConvertObject(E * pObject, conversion_parameters)
{
    if (NULL == pObject)
    {
        // nothing to convert
        return NULL;
    }
    if (typeid(E) != typeid(*pObject))
    {
        // the object should be of class E and NOT
        // polymorphic to class E
        return NULL;
    }
    if (is_additional_memory_needed_for_conversion( typeid(E),
                                                    typeid(B)))
    {
        if (!is_additional_memory_allocated(pObject, typeid(E),
                                            typeid(B)))
        {
            // additional memory needed for class E may not have
            // been allocated for pObject during its construction
            return NULL;
        }
    }
    // invoke INTERNAL destructor for class E
    pObject->E::~E( );
    // this block is repeated for each sub-object C
    // within E excluding B
    {
        // destroy sub-object of type C by invoking
        // EXTERNAL destructor for class C
        // EXTERNAL destructors in turn invoke base class
        // destructors and are visible to programmers
        C * pObjectC = pObject + offset(typeid(E), typeid(C));
        pObjectC->C::~C( );
    }
```

-continued

```
    B * pObjectB = pObject + offset(typeid(E), typeid(B));
    update_all_vee_table_references(pObjectB, typeid(E), typeid(B));
    return pObjectB;
}
```

Figure 7A:
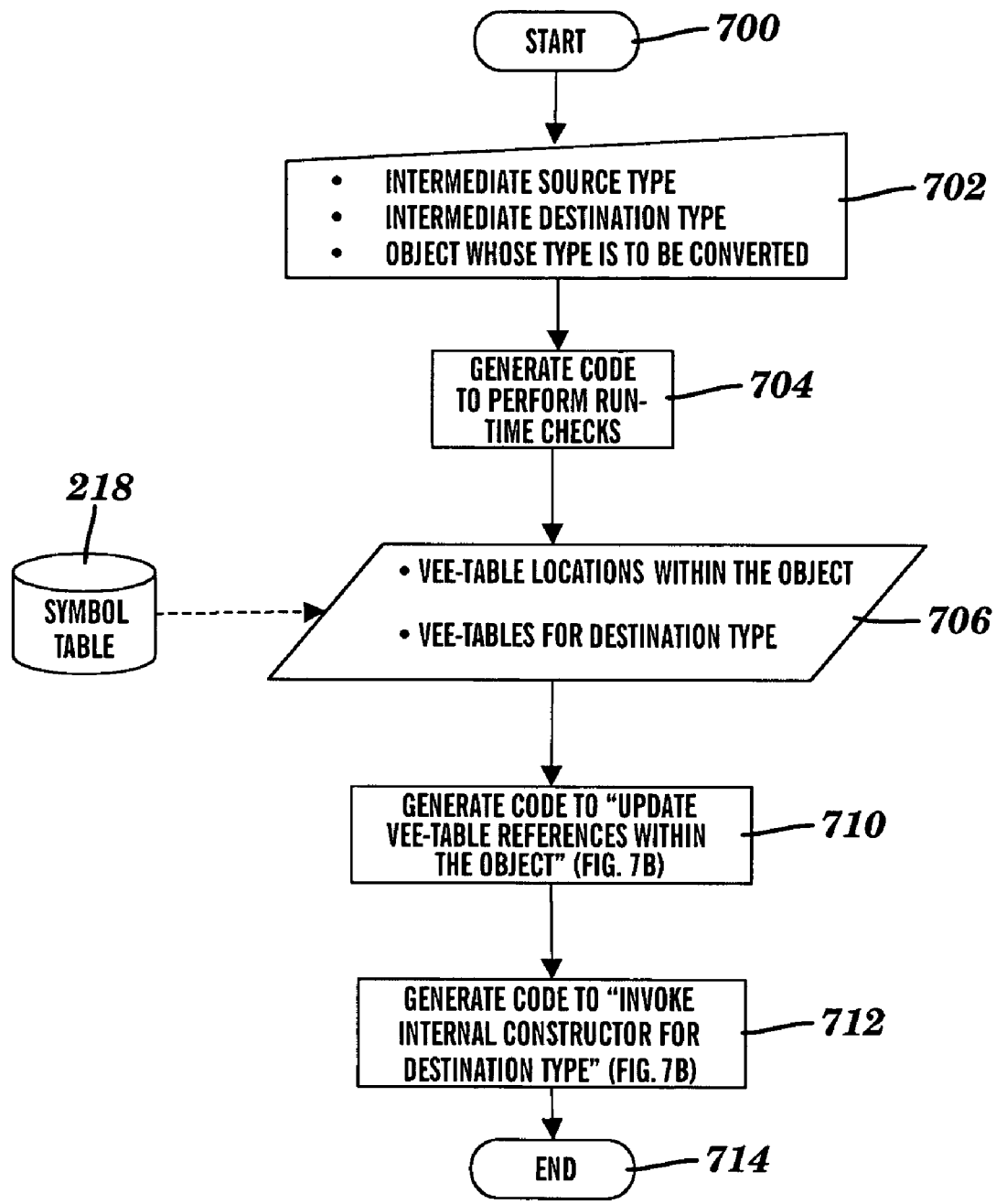
FIG. 7A is a flow chart showing a compile time method of generating the code for the simple down conversion of FIG. 4A, in accordance with embodiments of the present invention.

FIG. 7A is a flow chart showing a compile time method of generating the code for the simple down conversion of FIG. 4A, in accordance with embodiments of the present invention. This compile time method of generating simple down conversion code starts at step 700 with an intermediate source class, an intermediate destination class and the object whose class is to be converted as input 702. Step 704 generates code to perform run-time checks, which are described below relative to FIG. 7B. Step 706 determines v-table locations within the object and v-tables for the intermediate destination class by reading class information from symbol table 218. Step 710 generates code to update v-table references within the object. Code is then generated in step 712 to invoke an internal constructor for the intermediate destination type and the compile time simple down conversion method ends in step 714. The code generated in steps 710 and 712 is discussed below relative to FIG. 7B.

Figure 7B:
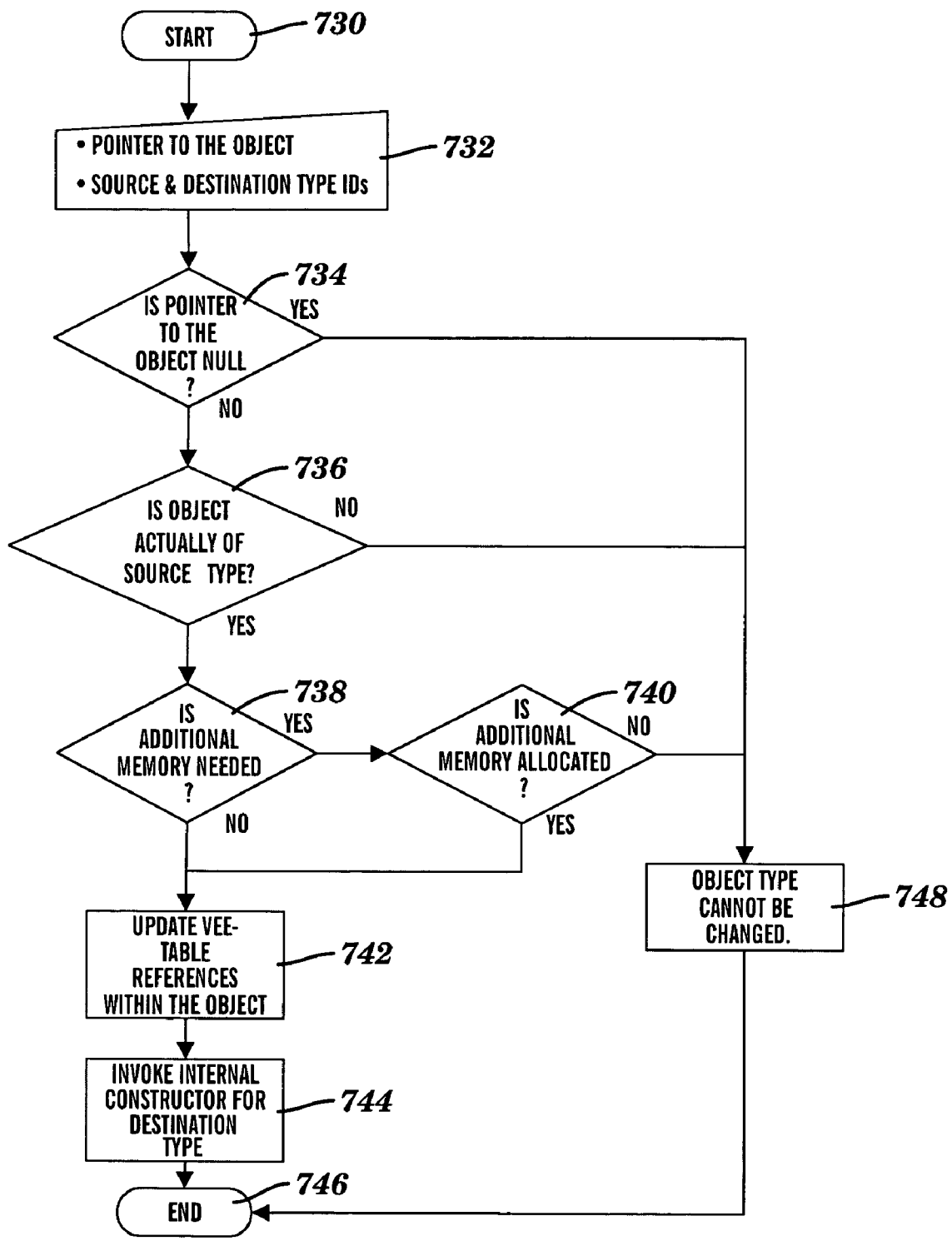
FIG. 7B is a flow chart showing a run-time method of executing the code of FIG. 7A to perform the simple down conversion of FIG. 4A, in accordance with embodiments of the present invention.

FIG. 7B is a flow chart showing a run-time method of executing the code of FIG. 7A to perform the simple down conversion of FIG. 4A, in accordance with embodiments of the present invention. This run-time simple down conversion method begins at step 730 and includes a pointer to the object, as well as intermediate source and intermediate destination type IDs as input 732. Steps 734, 736 738 and 740 comprise the run-time checks referenced by FIG. 7A. In inquiry step 734, if the pointer to the object is not NULL, inquiry step 736 checks if the object is of the intermediate source class. If step 736 determines that the object is of the intermediate source class, inquiry step 738 checks if the amount of memory required by the intermediate destination class exceeds the amount of memory required by the intermediate source class (i.e., if additional memory is needed). If additional memory is needed, then inquiry step 740 checks if the additional memory needed is allocated to the object. If additional memory is not needed in step 738 or if additional memory is allocated in step 740, then v-table references within the object are updated in step 742 to reference the intermediate destination class. Step 744 invokes an internal constructor for the intermediate destination class and the run-time method for simple down conversion ends at step 746. Returning to the run-time checks discussed above, if the pointer in step 734 is NULL or if the object is not of the source class in step 736, or if the additional memory is needed in step 738 and the additional memory is not allocated to the object, then the object cannot be changed in step 748, and the run-time simple down conversion method ends in step 746.

The following pseudo-code can be used to implement the simple down conversion discussed above. As one example, this pseudo-code converts an object of class A to class C in the hierarchy depicted in FIG. 2B:

```
// Simple Down Conversion
// Converts an object of class A to class C
// Input:    pObject - pointer to the object
//           conversion_parameters - additional optional input
// Output:   returns NULL on failure, else pointer to the converted
//           object
C * ConvertObject(A * pObject, conversion_parameters)
{
    if (NULL == pObject)
    {
        // nothing to convert
        return NULL;
    }
    if (typeid(A) != typeid(*pObject))
    {
        // the object should be of class A and NOT
        // polymorphic to class A
        return NULL;
    }
    if (is_additional_memory_needed_for_conversion(typeid(A),
                                                     typeid(C)))
    {
        if (!is_additional_memory_allocated(pObject, typeid(A),
                                                     typeid(C)))
        {
            // additional memory needed for class C may not have
            // been allocated for pObject during its construction
            return NULL;
        }
    }
    update_all_vee_table_references(pObject, typeid(A), typeid(C));
    // invoke INTERNAL constructor for class C
    // INTERNAL constructors do not in turn invoke constructors
    // for base classes, and are visible only to compilers
    // conversion parameters should resolve ambiguities if
    // constructor for class C is overloaded.
    C * pObjectC = pObject + offset(typeid(A), typeid(C));
    pObjectC->C::C(conversion_parameters);
    return pObjectC;
}
```

Figure 8A:
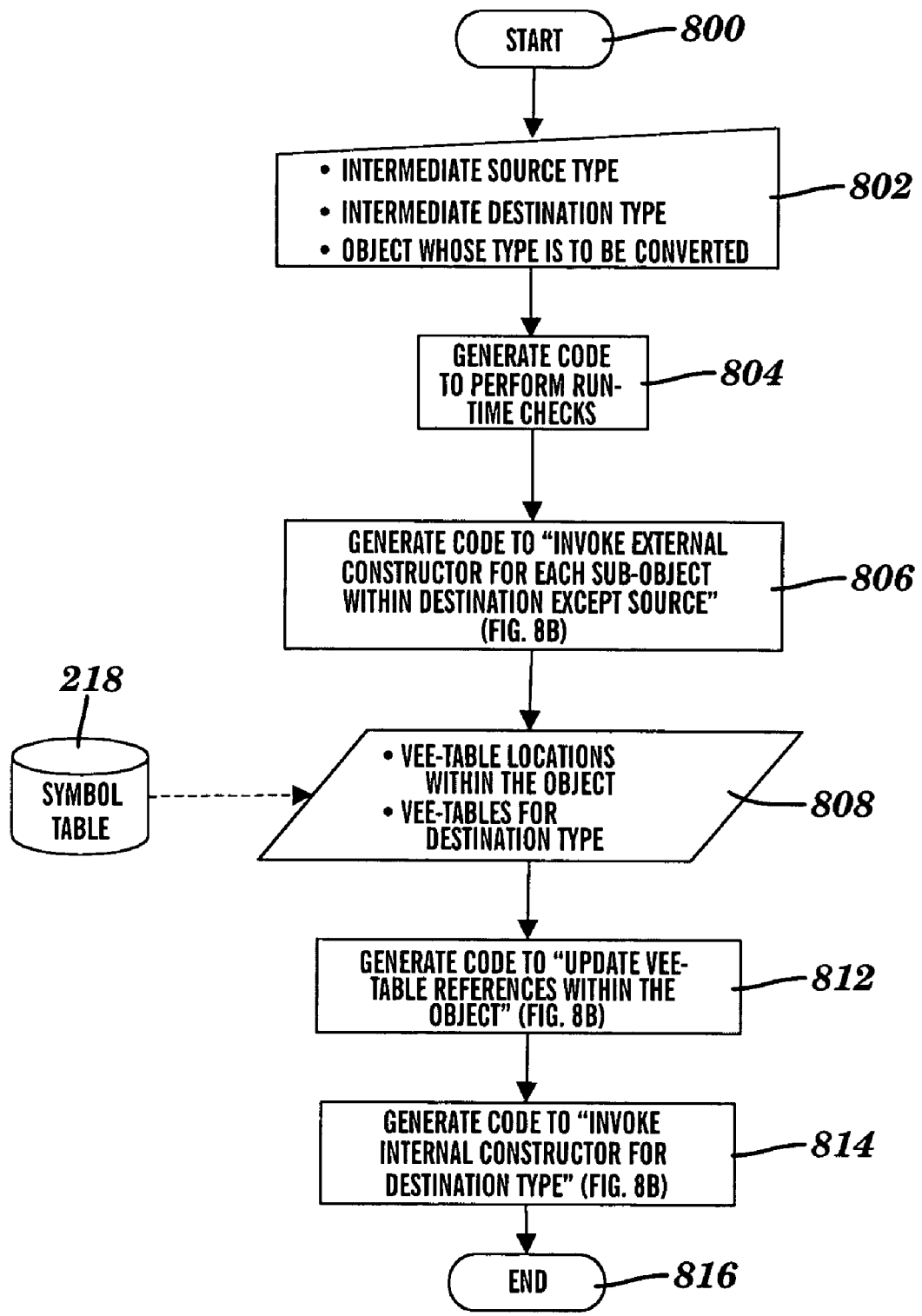
FIG. 8A is a flow chart showing a compile time method of generating the code for the down conversion with construction of sub-objects of FIG. 4A, in accordance with embodiments of the present invention.

FIG. 8A is a flow chart showing a compile time method of generating the code for the down conversion with construction of sub-objects of FIG. 4A, in accordance with embodiments of the present invention. This compile time method for down conversion with construction starts at step 800 with an intermediate source class, an intermediate destination class and the object whose class is to be converted as input 802. Step 804 generates code to perform run-time checks, which are discussed below relative to FIG. 8B. Step 806 generates code to invoke an external constructor for each sub-object within the intermediate destination class, but not including the intermediate source class. As used herein, an external constructor is a constructor visible to a programmer, and which will cascade calls to base classes. Step 808 determines v-table locations within the object and v-tables for the intermediate destination class by reading class information from symbol table 218. Step 812 generates code to update v-table references within the object to reference the intermediate destination class. Finally, code is generated to invoke an internal constructor for the intermediate destination class in step 814, and the compile time method for down conversion with construction ends at step 816. The code generated by steps 806, 812, and 814 is discussed below relative to FIG. 8B.

Figure 8B:
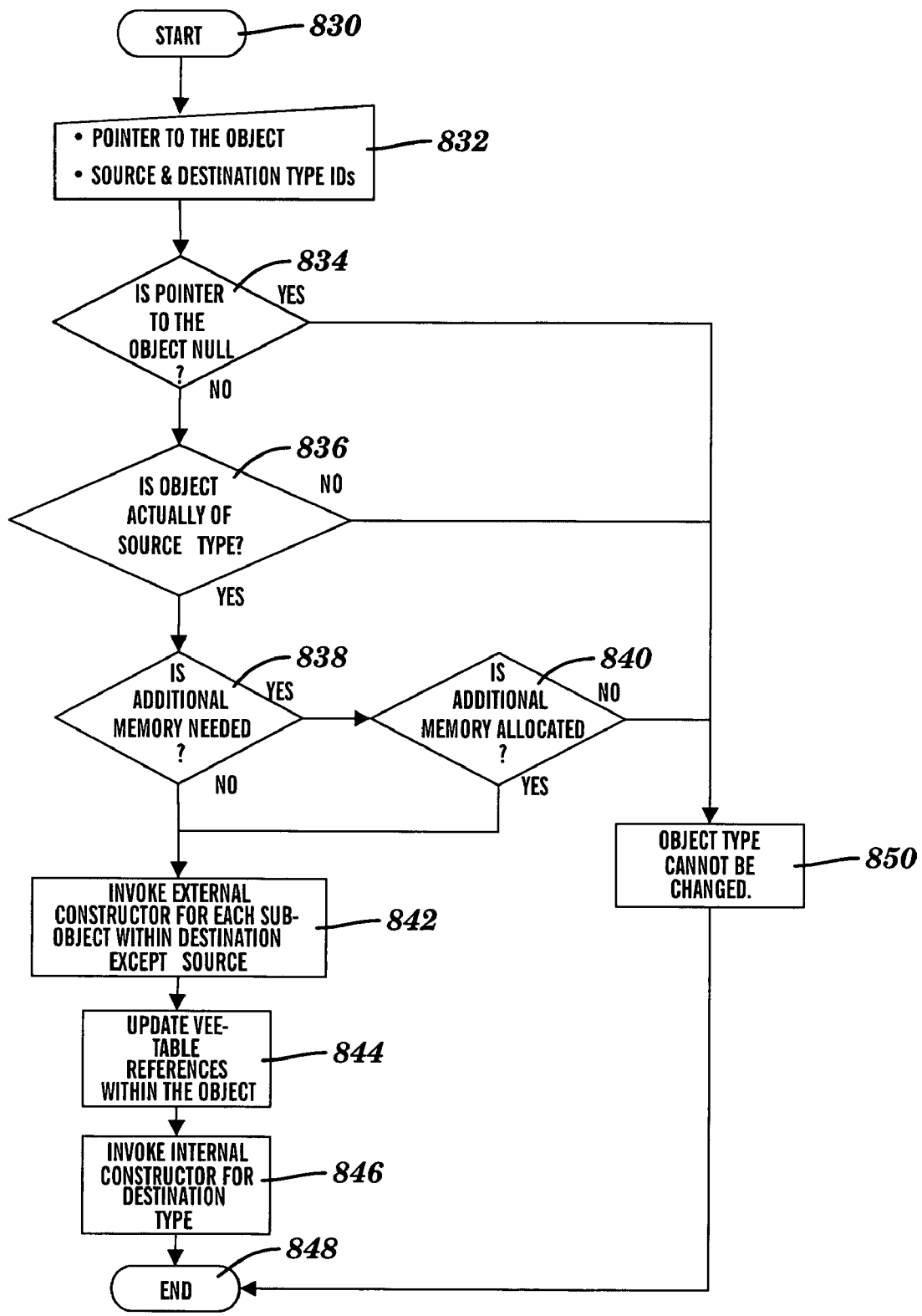
FIG. 8B is a flow chart showing a run-time method of executing the code of FIG. 8A to perform the down conversion with construction of sub-objects of FIG. 4A, in accordance with embodiments of the present invention.

FIG. 8B is a flow chart showing a run-time method of executing the code of FIG. 8A to perform the down conversion with construction of sub-objects of FIG. 4A, in accordance with embodiments of the present invention. This run-time method for down conversion with construction starts at step 830 and includes a pointer to the object, as well as intermediate source and intermediate destination type IDs as input 832. Inquiry steps 834, 836, 838 and 840 are the run-time checks referenced by FIG. 8A. Inquiry step 834 checks if the pointer to the object is NULL. If the pointer to the object is not NULL, inquiry step 836 checks if the object is of the intermediate source class. If the object is of the intermediate source class, inquiry step 838 checks if the amount of memory required by the intermediate destination class exceeds the amount of memory required by the intermediate source class (i.e., if additional memory is needed). If the additional memory is needed, then step 840 determines if the additional memory is allocated to the object. If the additional memory is not needed in step 838 or if the additional memory is allocated in step 840, then an external constructor is invoked for each sub-object within the intermediate destination class, but not including the intermediate source class. The v-table references within the object are then updated to reference the intermediate destination class in step 844. Finally, an internal constructor is invoked in step 846 for the intermediate destination class, and the run-time method for down conversion with construction ends at step 848. Returning to the run-time checks discussed above, if the pointer to the object is NULL in step 834, or if the object is not of the source class in step 836, or if the additional memory is needed in step 838 but is not allocated in step 840, then the object type cannot be changed in step 850, and the run-time method ends in step 848.

The following pseudo-code can be used to implement the down conversion with construction discussed above relative to FIGS. 8A & 8B. As one example, this pseudo-code converts an object of class B to class E, as shown in the hierarchy depicted in FIG. 2B:

```
// Down Conversion with construction of additional sub-objects
// Converts an object of class B to class E
// Input:    pObject - pointer to the object
//           conversion_parameters - additional optional input
// Output:   returns NULL on failure, else pointer to the converted
//           object
E * ConvertObject(B * pObject, conversion_parameters)
{
    if (NULL == pObject)
    {
        // nothing to convert
        return NULL;
    }
    if (typeid(B) != typeid(*pObject))
    {
        // the object should be of class B and NOT
        // polymorphic to class B
        return NULL;
    }
    if (is_additional_memory_needed_for_conversion( typeid(B),
                                                    typeid(E)))
    {
        if (!is_additional_memory_allocated(pObject, typeid(B),
                                            typeid(E)))
        {
            // additional memory needed for class E may not have
            // been allocated for pObject during its construction
            return NULL;
        }
    }
    // this block is repeated for each sub-object C
    // within E excluding B
    {
        // construct sub-object of type C by invoking
        // EXTERNAL constructor for class C
        // EXTERNAL constructors in turn invoke base class
        // constructors and are visible to programmers
        C * pObjectC = pObject + offset(typeid(B), typeid(C));
        pObjectC->C::C(conversion_parameters);
    }
    update_all_vee_table_references(pObject, typeid(B), typeid(E));
    // invoke INTERNAL constructor for class E
    E * pObjectE = pObject + offset(typeid(B), typeid(E));
    pObjectE->E::E(conversion_parameters);
    return pObjectE;
}
```

In the full implementation discussion above with respect to FIGS. 5A, 5B, 6A, 6B, 7A, 7B, 8A & 8B, the update of the object's v-table pointer from referencing the source class to referencing the destination class provides a run-time conversion of the object's class from the source class to the destination class. Performing full implementation class conversion changes the object layout by updating the v-table pointer and possibly other data members of the object, while keeping the memory address of the object layout constant. Since the memory address of the object layout remains the same after the conversion, the object's reference remains the same after the conversion, thereby allowing older references to the object to remain valid. For example, in a library system that is represented by the object-oriented environment of the present invention, classes represent two types of library patrons, corporate employees and students, and class properties include the patron's account number and duration of membership in the library system. When a student object who is a member of the library system becomes a corporate employee, a class conversion is required. Since the student object's reference (e.g., account number) remains the same after the object's conversion to corporate employee, the total history of the object remains available to the system after the class conversion. For instance, if library policies differed based on a patron's duration of membership, the system would be able to determine the complete duration of membership of the student who became a corporate employee (i.e., the duration of the object's student membership plus the duration of the object's corporate employee membership).

Further, the full implementation techniques discussed above perform a run-time class conversion from a source class to a destination class without requiring a change in any class layout. As used herein, a change in a class layout is broadly used to refer to, for example, a modification of the properties and/or behaviors (e.g., class members and/or functions) of the class layout, or a substitution of a second class layout for a first class layout which causes multiple objects (or all objects in a class) to migrate from a first class associated with the first class layout to a second class associated with the second class layout. Instead, the present invention provides a class conversion that changes the object layout of a single object. Also, the destination class in the present invention can be any class in a plurality of classes in an object-oriented programming environment. The present invention does not limit the destination class to being in a set of one or more specifically defined or specifically modified classes.

Still further, the full implementation class conversion discussed above does not require the conventional conversion techniques that include a temporary storage of object information, followed by destroying the object, recreating the object with modified properties and/or behaviors, and retrieving and providing the temporarily stored information to the newly created object. The complex programming and the execution and space costs associated with such temporary storage techniques are avoided in the present invention.

Class and Object Layouts

Figure 9A:
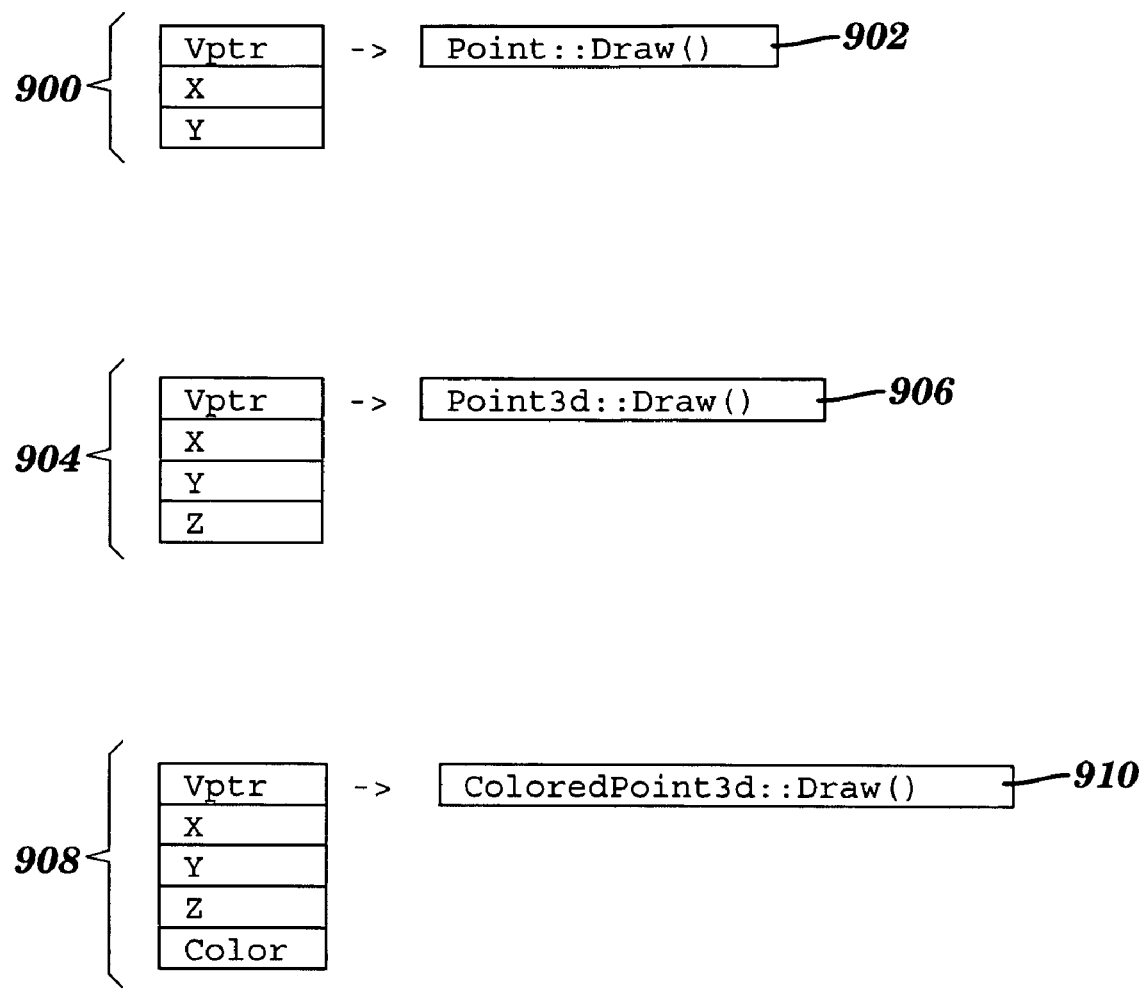
FIG. 9A depicts class layouts used in an example of the full implementation run-time class conversion of FIG. 4B, in accordance with embodiments of the present invention.
Figure 9B:
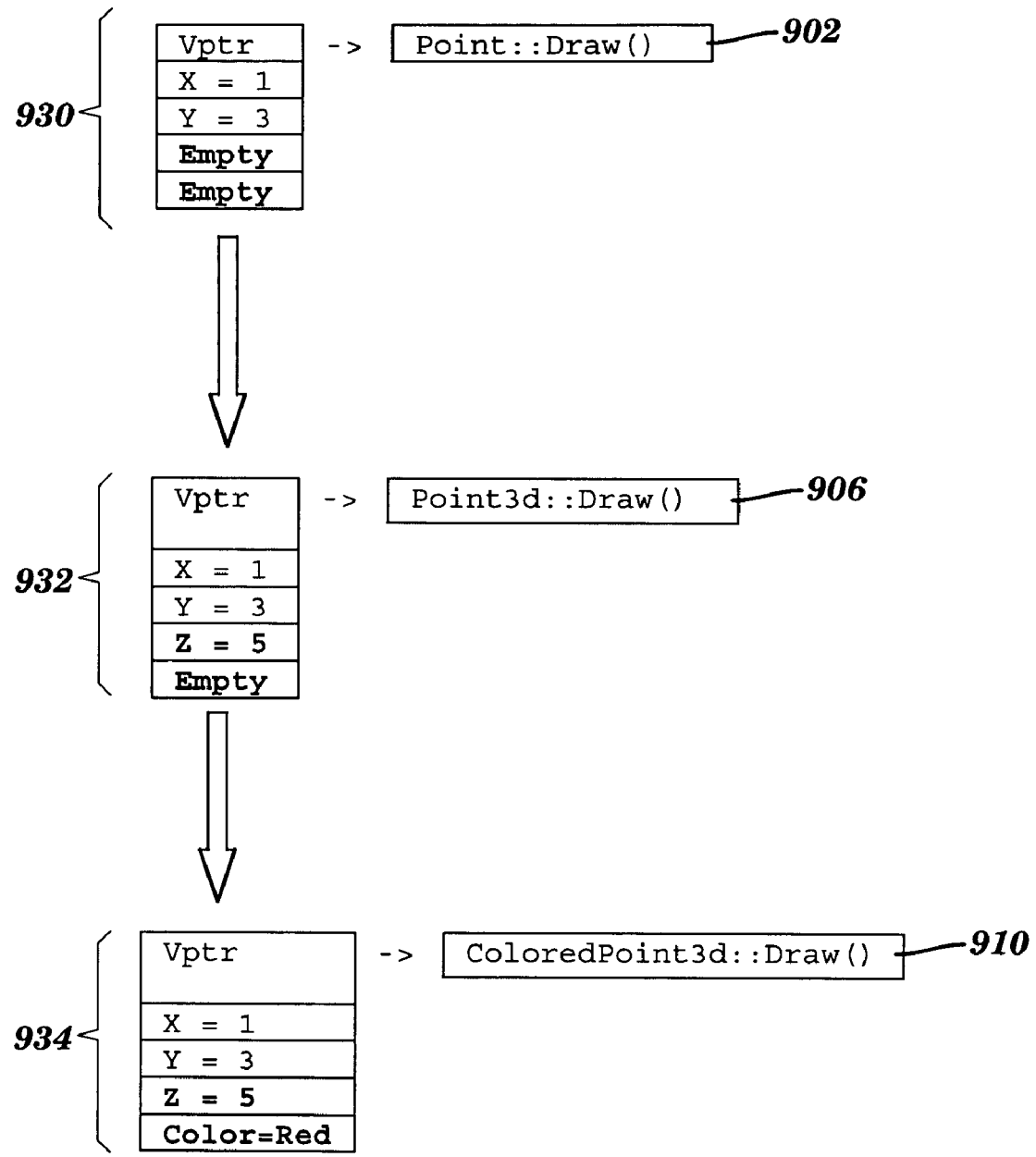
FIG. 9B depicts an object layout used in an example of the full implementation run-time class conversion of FIG. 4B, in accordance with embodiments of the present invention.

FIGS. 9A & 9B depict class layouts and an object layout, respectively, which are used in the following example of the full implementation run-time class conversion of FIG. 4B, in accordance with embodiments of the present invention. In this example, a graphical system consisting of points is represented by three C++ classes, which are defined as follows:

```
class Point
{
    int X;
    int Y;
    virtual Draw( );
};
class Point3d : public Point
{
    int Z;
    virtual Draw( );
};
class ColoredPoint3d : Point3d
{
    int Color;
    virtual Draw( );
};
```

In this graphical system example, a point can have X,Y or X,Y,Z coordinates, and "Color" is the color of the point. In FIG. 9A, class layout 900 is associated with class Point, and includes a pointer (Vptr) that references v-table 902. Class layout 904 is associated with class Point3d, and includes a pointer (Vptr) that references v-table 906. Class layout 908 is associated with class ColoredPoint3d, and includes a pointer (Vptr) that references v-table 910.

Continuing the FIG. 9A example in FIG. 9B, an object layout 930, 932, 934 is represented at three different points during run-time. The object layout is associated with an object whose class is to be converted from Point to ColoredPoint3d via an intermediate class Point3d. Object layout 930 resides at, for example, memory address 1000, and is associated with class Point. Extra memory (e.g., the "empty" locations in object layout 930) has been allocated, so the full implementation run-time class conversion discussed above may be used. Since object layout 930 is associated with class Point, which in turn, is associated with class layout 900, object layout 930 includes a pointer (Vptr) referencing v-table 902, the same v-table referenced by class layout 900. When an intermediate conversion converts the object's class from Point to Point3d, the object layout is updated from object layout 930 to object layout 932, which includes a pointer (Vptr) referencing v-table 906 (i.e., the same v-table associated with class Point3d's class layout 904). A conversion parameter of Z=5 adds a data member to object layout 932. The address of object layout 932 remains at memory address 1000. Finally, when another intermediate conversion converts the object's class from Point3d to ColoredPoint3d, the object layout changes to object layout 934, whose Vptr pointer references v-table 910 (i.e., the same v-table associated with class ColoredPoint3d's class layout 908). A conversion parameter of Color=Red adds a data member to object layout 934. The address of object layout 934 remains memory address 1000. These conversions to Point3d and to ColoredPoint3d require no changes to any class layout. For instance, no extension to class Point 3d or to class ColoredPoint3d is needed to accommodate the extra memory requirements of the intermediate destination classes. Instead, that extra memory is allocated to object layout 930. Also, no class layout substitutions were required which would have forced a migration of multiple objects of a source class to a destination class.

The example discussed above illustrates that the run-time type conversion of the present invention changes the object layout (e.g., the v-table reference is updated to reflect the intermediate destination class), while the address of the object layout remains the same, and while requiring no modifications to, or substitutions for, any class layout. Since the address of the object layout remains the same, the object's type is converted in-place and older references to the object are still valid. Further, the object's type is converted without requiring a momentary halt or restart of computer program 122, and without object or class information being temporarily committed to, for instance, a database while an object is destroyed and recreated with modified properties and/or behaviors. By avoiding this temporary storage technique, the present invention allows an object (e.g., an object of significant status, such as a manager object in an employee database) to be available immediately after a class conversion.

Full Implementation Examples

FIG. 10 depicts a table of examples of full implementation run-time class conversions of FIG. 4B, which employ the hierarchy of FIG. 2B, and which list types of intermediate full implementation conversions of FIGS. 5B, 6B, 7B & 8B needed for each example, in accordance with embodiments of the present invention. In the table of FIG. 10, an entry of "up conversion" indicates a simple up conversion of FIG. 5B and an entry of "down conversion" indicates a simple down conversion of FIG. 7B.

The first conversion example (listed under the desired conversion column) in the table in FIG. 10 is class B (source) to class D (destination). The destination class is not polymorphic to the source class (i.e., class D is not derived from class B). Relating this class B to class D conversion to the employee database example discussed above, the object (employee) whose class is to be converted is relieved of his or her old duties. For example, an employee initially from the accounting department is moved to the administration department. The employee's responsibilities specific to accounting are no longer applicable. Also, the employee's subordinates and supervisor will probably change.

For the class B to class D conversion in FIG. 10, the class hierarchy traversals upward and downward discussed above relative to FIG. 4B are used. The table in FIG. 10 indicates that the first intermediate class used in an intermediate conversion is class A. That is, the first intermediate conversion in the traversal upward is class B to class A (i.e., a simple up conversion since the intermediate source class B is not subject to multiple inheritance). Since class A is the common parent to the source and destination, the traversal upward ends and a traversal downward begins with intermediate conversion class A to class C (simple down conversion), followed by intermediate conversion class C to class D (simple down conversion). For the traversal downward, simple down conversions are sufficient because multiple inheritance does not apply to the intermediate destination classes (class C and class D).

A class B to class D conversion is permitted subject to the fulfillment of a condition that all existing references to the object which are of a type which is not a common parent class of class B and class D are released by its holder. After the references are released, appropriate destructors are invoked in the intermediate up conversion of class B to class A (e.g., destructor B::~B is invoked). In the two simple down conversions, constructors are invoked (e.g., C::C and then D::D). If any ambiguity exists in selecting which constructors to invoke for C and D, the conversion parameters can resolve the ambiguity.

The second conversion example in the table of FIG. 10 is class B to class E. In this case, the destination class is multiply derived from class B and class C. Hence during conversion from class B to class E, object C (a sub-object within E) is constructed within the extra space allocated to the object to be converted. That is, the down conversion with construction of sub-objects discussed relative to FIG. 8B is applicable. Constructors are invoked in the sequence (1) A::A if C is not virtually inherited from A; (2) C::C; and (3) E::E. Once again, any ambiguity in selecting which constructors to invoke is resolvable via the conversion parameters. The references to v-tables are updated from class B to class E, thereby converting the object under consideration from class B to class E.

Extra allocation of space may not always be feasible. If all instances within the class hierarchy are considered for extra allocation, the increase in the total space requirement can be substantial. Further, all objects may not eventually be converted to a newer class in their lifetime. Also, many objects may not reach up to a leaf level on the class hierarchy (i.e., may not be derived from another class in the hierarchy). Considerable space saving can be achieved by using the aforementioned 'convertible' attribute at the object level specifying classes to which conversion is permissible.

The third conversion example in the table of FIG. 10 is class D to class A. All references to the object being converted, which are of a type to which class A is not polymorphic (e.g., class C and class D), must be released by their holders to eliminate "hanging references." Destructors D::~D and then C::~C must be invoked to destroy members not associated with class A. Finally, references to v-tables are updated to point to a v-table associated with class A. These steps are completed by using the traversal upward of FIG. 4B. Two simple up conversions are performed as intermediate conversions (class D to class C and class C to class A). The simple up conversions use the method described above relative to FIG. 5B.

The fourth conversion example listed in the table of FIG. 10 is class E to class B. Since class E is derived via multiple inheritance from class B and class C, the wholly contained class C object (a sub-object within E) needs to be destructed. Thus, the down conversion with destruction of sub-objects method of FIG. 8B is applied to this case. Destructors are invoked in the sequence (1) E::~E; (2) C::~C; and (3) A::~A if C is not virtually inherited from A. V-table references of the original class E object are ultimately updated to reference a v-table associated with class B, thereby converting the object in question from class E to class B.

Finally, the fifth conversion example listed in the table of FIG. 10 is class D to class B. Using the traversal up and down of FIG. 4B, this conversion includes two simple up conversions (see FIG. 5B) followed by a simple down conversion (see FIG. 7B). The first two simple up conversions comprise the same class D to class A conversion described above. The final simple down conversion (class A to class B) invokes a constructor (B::B). Again v-table references of the source class D are updated to the intermediate destination classes until they finally point to a v-table associated with the destination class B.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of converting, at runtime, a class of an object in an object-oriented programming environment, said method comprising:

defining a plurality of classes in said object-oriented programming environment;

receiving C++ source code by a computing system and subsequent to said defining said plurality of classes;

generating intermediate code from said source code during compile time, wherein said generating said intermediate code is performed by said computing system and subsequent to said receiving said source code;

identifying, by said computing system and subsequent to said generating said intermediate code, a type conversion statement within said intermediate code, wherein said type conversion statement indicates that said object is to be converted from a source class to a destination class, wherein said source class and said destination class are included in said plurality of classes, wherein said destination class is not an extension of another class of said plurality of classes, wherein said source class defines one or more source class members, and wherein said destination class defines one or more destination class members;

determining, by said computing system and subsequent to said identifying said type conversion statement, that said destination class is polymorphic to said source class;

determining, by said computing system and subsequent to said identifying said type conversion statement, that a first amount of memory space required for said destination class is less than or equal to a second amount of memory space required for said source class, wherein said determining that said first amount of memory space is less than or equal to said second amount of memory space includes determining that said one or more destination class members does not include a non-static member in addition to said one or more source class members, and wherein said non-static member is associated with an instance of said destination class but is not associated with said destination class as a whole;

retrieving, by said computing system and subsequent to said identifying said type conversion statement, a class hierarchy from a symbol table, wherein said class hierarchy includes said source class, said destination class and a common parent class, wherein said common parent class includes a member or a function inherited by said source class and said destination class;

traversing up at compile time, by said computing system and subsequent to said retrieving said class hierarchy, said class hierarchy from said source class to said common parent class via a first set of one or more pairs of classes included in said class hierarchy, wherein a pair of said first set of one or more pairs includes an intermediate upward source class and an intermediate upward destination class, and wherein said traversing up at compile time includes generating a first set of machine-executable code;

traversing down at compile time, by said computing system and subsequent to said traversing up at compile time, said class hierarchy from said common parent class to said destination class via a second set of one or more pairs of classes included in said class hierarchy, wherein a pair of said second set of one or more pairs includes an intermediate downward source class and an intermediate downward destination class, and wherein said traversing down at compile time includes generating a second set of machine-executable code;

retrieving, by said computing system, a source class layout of said source class, wherein said source class layout is a first data structure that specifies a plurality of properties of said source class including said one or more source class members and a pointer to a first table (first v-table) of one or more virtual functions that determine one or more behaviors of said source class;

retrieving, by said computing system, a destination class layout of said destination class, wherein said destination class layout is a second data structure that specifies a plurality of properties of said destination class including said one or more destination class members and a pointer to a second table (second v-table) of one or more virtual functions that determine one or more behaviors of said destination class;

retrieving, by said computing system, an object layout of said object, wherein said object layout is a third data structure that specifies a plurality of properties of said object including one or more data members and a pointer to a table (v-table referenced by said object) of one or more virtual functions that are bound to said object at runtime and that determine one or more behaviors of said object at runtime, wherein said pointer to said v-table referenced by said object is initially said pointer to said first v-table;

receiving a pointer to said object by said computing system at runtime, wherein said pointer is included in a plurality of pointers referencing said object at runtime;

updating said pointer to said v-table referenced by said object from said pointer to said first v-table to said pointer to said second v-table by said computing system at runtime, wherein said updating said pointer includes:
    traversing up at runtime, by said computing system and subsequent to said receiving said pointer to said object, said class hierarchy from said source class to said common parent class via said first set of one or more pairs of classes included in said class hierarchy, wherein said traversing up at runtime includes executing said first set of machine-executable code for each pair in said first set of one or more pairs, wherein said executing said first set of machine-executable code includes:
        invoking an internal destructor to free resources of a memory of said computing system for said intermediate upward source class, wherein said internal destructor is a C++ class function for freeing memory, and
        updating said pointer to said v-table referenced by said object to a pointer to a v-table referenced by said intermediate upward destination class;
    traversing down at runtime, by said computing system and subsequent to said traversing up at runtime, said class hierarchy from said common parent class to said destination class via said second set of one or more pairs of classes included in said class hierarchy, wherein said traversing down at runtime includes executing said second set of machine-executable code for each pair in said second set of one or more pairs, wherein said executing said second set of machine-executable code includes:
        updating said pointer to said v-table referenced by said object to a pointer to a v-table referenced by said intermediate downward destination class, and
        invoking an internal constructor that obtains resources of said memory for said intermediate downward destination class, wherein said internal constructor is a C++ class function for obtaining memory resources,
wherein said updating said pointer is performed without changing an address of said object layout and without changing said source class layout, said destination class layout or any other class layout of said plurality of classes, and wherein said plurality of pointers referencing said object remain valid after said updating said pointer.

2. A computing system comprising a processor and a computer-readable memory unit coupled to said processor, said memory unit containing instructions that when executed by said processor implement a method of converting, at runtime, a class of an object in an object-oriented programming environment, said method comprising:

defining a plurality of classes in said object-oriented programming environment;

receiving C++ source code subsequent to said defining said plurality of classes;

generating intermediate code from said source code during compile time and subsequent to said receiving said source code;

identifying, subsequent to said generating said intermediate code, a type conversion statement within said intermediate code, wherein said type conversion statement indicates that said object is to be converted from a source class to a destination class, wherein said source class and said destination class are included in said plurality of classes, wherein said destination class is not an extension of another class of said plurality of classes, wherein said source class defines one or more source class members, and wherein said destination class defines one or more destination class members;

determining, subsequent to said identifying said type conversion statement, that said destination class is polymorphic to said source class;

determining, subsequent to said identifying said type conversion statement, that a first amount of memory space required for said destination class is less than or equal to a second amount of memory space required for said source class, wherein said determining that said first amount of memory space is less than or equal to said second amount of memory space includes determining that said one or more destination class members does not include a non-static member in addition to said one or more source class members, and wherein said non-static member is associated with an instance of said destination class but is not associated with said destination class as a whole;

retrieving, subsequent to said identifying said type conversion statement, a class hierarchy from a symbol table, wherein said class hierarchy includes said source class, said destination class and a common parent class, wherein said common parent class includes a member or a function inherited by said source class and said destination class;

traversing up at compile time, subsequent to said retrieving said class hierarchy, said class hierarchy from said source class to said common parent class via a first set of one or more pairs of classes included in said class hierarchy, wherein a pair of said first set of one or more pairs includes an intermediate upward source class and an intermediate upward destination class, and wherein said traversing up at compile time includes generating a first set of machine-executable code;

traversing down at compile time, subsequent to said traversing up at compile time, said class hierarchy from said common parent class to said destination class via a second set of one or more pairs of classes included in said class hierarchy, wherein a pair of said second set of one or more pairs includes an intermediate downward source class and an intermediate downward destination class, and wherein said traversing down at compile time includes generating a second set of machine-executable code;

retrieving a source class layout of said source class, wherein said source class layout is a first data structure that specifies a plurality of properties of said source class including said one or more source class members and a pointer to a first table (first v-table) of one or more virtual functions that determine one or more behaviors of said source class;

retrieving a destination class layout of said destination class, wherein said destination class layout is a second data structure that specifies a plurality of properties of said destination class including said one or more destination class members and a pointer to a second table (second v-table) of one or more virtual functions that determine one or more behaviors of said destination class;

retrieving an object layout of said object, wherein said object layout is a third data structure that specifies a plurality of properties of said object including one or more data members and a pointer to a table (v-table referenced by said object) of one or more virtual functions that are bound to said object at runtime and that determine one or more behaviors of said object at runtime, wherein said pointer to said v-table referenced by said object is initially said pointer to said first v-table;

receiving a pointer to said object at runtime, wherein said pointer is included in a plurality of pointers referencing said object at runtime;

updating at runtime said pointer to said v-table referenced by said object from said pointer to said first v-table to said pointer to said second v-table, wherein said updating said pointer includes:

traversing up at runtime, subsequent to said receiving said pointer to said object, said class hierarchy from said source class to said common parent class via said first set of one or more pairs of classes included in said class hierarchy, wherein said traversing up at runtime includes executing said first set of machine-executable code for each pair in said first set of one or more pairs, wherein said executing said first set of machine-executable code includes:

invoking an internal destructor to free resources of a memory of said computing system for said intermediate upward source class, wherein said internal destructor is a C++ class function for freeing memory, and updating said pointer to said v-table referenced by said object to a pointer to a v-table referenced by said intermediate upward destination class;

traversing down at runtime, subsequent to said traversing up at runtime, said class hierarchy from said common parent class to said destination class via said second set of one or more pairs of classes included in said class hierarchy, wherein said traversing down at runtime includes executing said second set of machine-executable code for each pair in said second set of one or more pairs, wherein said executing said second set of machine-executable code includes:

updating said pointer to said v-table referenced by said object to a pointer to a v-table referenced by said intermediate downward destination class, and invoking an internal constructor that obtains resources of said memory for said intermediate downward destination class, wherein said internal constructor is a C++ class function for obtaining memory resources, wherein said updating said pointer is performed without changing an address of said object layout and without changing said source class layout, said destination class layout or any other class layout of said plurality of classes, and wherein said plurality of pointers referencing said object remain valid after said updating said pointer.

3. At least one program storage device readable by a machine, tangibly embodying at least one program of instructions executable by the machine to perform a method of converting, at run-time, a class of an object in an object-oriented programming environment, said method comprising:

defining a plurality of classes in said object-oriented programming environment;

receiving C++ source code subsequent to said defining said plurality of classes;

generating intermediate code from said source code during compile time and subsequent to said receiving said source code;

identifying, subsequent to said generating said intermediate code, a type conversion statement within said intermediate code, wherein said type conversion statement indicates that said object is to be converted from a source class to a destination class, wherein said source class and said destination class are included in said plurality of classes, wherein said destination class is not an extension of another class of said plurality of classes, wherein said source class defines one or more source class members, and wherein said destination class defines one or more destination class members;

determining, subsequent to said identifying said type conversion statement, that said destination class is polymorphic to said source class;

determining, subsequent to said identifying said type conversion statement, that a first amount of memory space required for said destination class is less than or equal to a second amount of memory space required for said source class, wherein said determining that said first amount of memory space is less than or equal to said second amount of memory space includes determining that said one or more destination class members does not include a non-static member in addition to said one or more source class members, and wherein said non-static member is associated with an instance of said destination class but is not associated with said destination class as a whole;

retrieving, subsequent to said identifying said type conversion statement, a class hierarchy from a symbol table, wherein said class hierarchy includes said source class, said destination class and a common parent class, wherein said common parent class includes a member or a function inherited by said source class and said destination class;

traversing up at compile time, subsequent to said retrieving said class hierarchy, said class hierarchy from said source class to said common parent class via a first set of one or more pairs of classes included in said class hierarchy, wherein a pair of said first set of one or more pairs includes an intermediate upward source class and an intermediate upward destination class, and wherein said traversing up at compile time includes generating a first set of machine-executable code;

traversing down at compile time, subsequent to said traversing up at compile time, said class hierarchy from said common parent class to said destination class via a second set of one or more pairs of classes included in said class hierarchy, wherein a pair of said second set of one or more pairs includes an intermediate downward source class and an intermediate downward destination class, and wherein said traversing down at compile time includes generating a second set of machine-executable code;

retrieving a source class layout of said source class, wherein said source class layout is a first data structure that specifies a plurality of properties of said source class including said one or more source class members and a pointer to a first table (first v-table) of one or more virtual functions that determine one or more behaviors of said source class;

retrieving a destination class layout of said destination class, wherein said destination class layout is a second data structure that specifies a plurality of properties of said destination class including said one or more destination class members and a pointer to a second table (second v-table) of one or more virtual functions that determine one or more behaviors of said destination class;

retrieving an object layout of said object, wherein said object layout is a third data structure that specifies a plurality of properties of said object including one or more data members and a pointer to a table (v-table referenced by said object) of one or more virtual functions that are bound to said object at runtime and that determine one or more behaviors of said object at runtime, wherein said pointer to said v-table referenced by said object is initially said pointer to said first v-table;

receiving a pointer to said object at runtime, wherein said pointer is included in a plurality of pointers referencing said object at runtime;

updating at runtime said pointer to said v-table referenced by said object from said pointer to said first v-table to said pointer to said second v-table, wherein said updating said pointer includes:

traversing up at runtime, subsequent to said receiving said pointer to said object, said class hierarchy from said source class to said common parent class via said first set of one or more pairs of classes included in said class hierarchy, wherein said traversing up at runtime includes executing said first set of machine-executable code for each pair in said first set of one or more pairs, wherein said executing said first set of machine-executable code includes:

invoking an internal destructor to free resources of a memory of said computing system for said intermediate upward source class, wherein said internal destructor is a C++ class function for freeing memory, and updating said pointer to said v-table referenced by said object to a pointer to a v-table referenced by said intermediate upward destination class;

traversing down at runtime, subsequent to said traversing up at runtime, said class hierarchy from said common parent class to said destination class via said second set of one or more pairs of classes included in said class hierarchy, wherein said traversing down at runtime includes executing said second set of machine-executable code for each pair in said second set of one or more pairs, wherein said executing said second set of machine-executable code includes:

updating said pointer to said v-table referenced by said object to a pointer to a v-table referenced by said intermediate downward destination class, and invoking an internal constructor that obtains resources of said memory for said intermediate downward destination class, wherein said internal constructor is a C++ class function for obtaining memory resources, wherein said updating said pointer is performed without changing an address of said object layout and without changing said source class layout, said destination class layout or any other class layout of said plurality of classes, and wherein said plurality of pointers referencing said object remain valid after said updating said pointer.

4. A process for deploying computing infrastructure, comprising integrating computer-readable code into a computing system, wherein the code in combination with the computing system is capable of performing a process of converting, at run-time, a class of an object in an object-oriented programming environment, said method comprising:

defining a plurality of classes in said object-oriented programming environment;

receiving C++ source code subsequent to said defining said plurality of classes;

generating intermediate code from said source code during compile time and subsequent to said receiving said source code;

identifying, subsequent to said generating said intermediate code, a type conversion statement within said intermediate code, wherein said type conversion statement indicates that said object is to be converted from a source class to a destination class, wherein said source class and said destination class are included in said plurality of classes, wherein said destination class is not an extension of another class of said plurality of classes, wherein said source class defines one or more source class members, and wherein said destination class defines one or more destination class members;

determining, subsequent to said identifying said type conversion statement, that said destination class is polymorphic to said source class;

determining, subsequent to said identifying said type conversion statement, that a first amount of memory space required for said destination class is less than or equal to a second amount of memory space required for said source class, wherein said determining that said first amount of memory space is less than or equal to said second amount of memory space includes determining that said one or more destination class members does not include a non-static member in addition to said one or more source class members, and wherein said non-static member is associated with an instance of said destination class but is not associated with said destination class as a whole;

retrieving, subsequent to said identifying said type conversion statement, a class hierarchy from a symbol table, wherein said class hierarchy includes said source class, said destination class and a common parent class, wherein said common parent class includes a member or a function inherited by said source class and said destination class;

traversing up at compile time, subsequent to said retrieving said class hierarchy, said class hierarchy from said source class to said common parent class via a first set of one or more pairs of classes included in said class hierarchy, wherein a pair of said first set of one or more pairs includes an intermediate upward source class and an intermediate upward destination class, and wherein said traversing up at compile time includes generating a first set of machine-executable code;

traversing down at compile time, subsequent to said traversing up at compile time, said class hierarchy from said common parent class to said destination class via a second set of one or more pairs of classes included in said class hierarchy, wherein a pair of said second set of one or more pairs includes an intermediate downward source class and an intermediate downward destination class, and wherein said traversing down at compile time includes generating a second set of machine-executable code;

retrieving a source class layout of said source class, wherein said source class layout is a first data structure that specifies a plurality of properties of said source class including said one or more source class members and a pointer to a first table (first v-table) of one or more virtual functions that determine one or more behaviors of said source class;

retrieving a destination class layout of said destination class, wherein said destination class layout is a second data structure that specifies a plurality of properties of said destination class including said one or more destination class members and a pointer to a second table (second v-table) of one or more virtual functions that determine one or more behaviors of said destination class;

retrieving an object layout of said object, wherein said object layout is a third data structure that specifies a plurality of properties of said object including one or more data members and a pointer to a table (v-table referenced by said object) of one or more virtual functions that are bound to said object at runtime and that determine one or more behaviors of said object at runtime, wherein said pointer to said v-table referenced by said object is initially said pointer to said first v-table;

receiving a pointer to said object at runtime, wherein said pointer is included in a plurality of pointers referencing said object at runtime;

updating at runtime said pointer to said v-table referenced by said object from said pointer to said first v-table to said pointer to said second v-table, wherein said updating said pointer includes:

traversing up at runtime, subsequent to said receiving said pointer to said object, said class hierarchy from said source class to said common parent class via said first set of one or more pairs of classes included in said class hierarchy, wherein said traversing up at runtime includes executing said first set of machine-executable code for each pair in said first set of one or more pairs, wherein said executing said first set of machine-executable code includes:

invoking an internal destructor to free resources of a memory of said computing system for said intermediate upward source class, wherein said internal destructor is a C++ class function for freeing memory, and updating said pointer to said v-table referenced by said object to a pointer to a v-table referenced by said intermediate upward destination class;

traversing down at runtime, subsequent to said traversing up at runtime, said class hierarchy from said common parent class to said destination class via said second set of one or more pairs of classes included in said class hierarchy, wherein said traversing down at runtime includes executing said second set of machine-executable code for each pair in said second set of one or more pairs, wherein said executing said second set of machine-executable code includes:

updating said pointer to said v-table referenced by said object to a pointer to a v-table referenced by said intermediate downward destination class, and invoking an internal constructor that obtains resources of said memory for said intermediate downward destination class, wherein said internal constructor is a C++ class function for obtaining memory resources, wherein said updating said pointer is performed without changing an address of said object layout and without changing said source class layout, said destination class layout or any other class layout of said plurality of classes, and wherein said plurality of pointers referencing said object remain valid after said updating said pointer.

* * * * *